US012632213B2

(12) United States Patent
Russell et al.

(10) Patent No.: US 12,632,213 B2
(45) Date of Patent: May 19, 2026

(54) AUDIO CONNECTION SELECTIONS BASED ON AUDIO DROP PREDICTIONS

(71) Applicant: Motorola Mobility LLC, Chicago, IL (US)

(72) Inventors: Michael E Russell, Lake Zurich, IL (US); Thomas Gitzinger, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 334 days.

(21) Appl. No.: 18/097,611

(22) Filed: Jan. 17, 2023

(65) Prior Publication Data

US 2024/0241688 A1    Jul. 18, 2024

(51) Int. Cl.
*G06F 3/16*        (2006.01)

(52) U.S. Cl.
CPC .................................. *G06F 3/165* (2013.01)

(58) Field of Classification Search
CPC ............. G06F 3/165; G06F 3/16; G06F 3/162
USPC ........................................................ 700/94
See application file for complete search history.

(56) References Cited

U.S. PATENT DOCUMENTS

| | | |
|---|---|---|
| 10,484,832 B1 | 11/2019 | Tyagi et al. |
| 10,499,194 B1 | 12/2019 | Tyagi et al. |
| 10,869,166 B2 | 12/2020 | Tyagi et al. |
| 11,051,260 B2 | 6/2021 | Gorsica et al. |
| 12,273,690 B2 | 4/2025 | Agrawal et al. |

| | | | | |
|---|---|---|---|---|
| 2008/0085681 A1* | 4/2008 | Wang | ................... | H04B 7/0408 |
| | | | | 455/72 |
| 2011/0051616 A1* | 3/2011 | Inada | .................. | H04L 25/0204 |
| | | | | 370/252 |
| 2011/0287719 A1* | 11/2011 | Pinder | ................... | H04W 76/45 |
| | | | | 455/41.3 |
| 2015/0326273 A1* | 11/2015 | Rakib | ................. | H04L 25/0212 |
| | | | | 375/131 |
| 2016/0324140 A1 | 11/2016 | Gregorich | | |
| 2019/0053013 A1* | 2/2019 | Markhovsky | ............. | G01S 5/12 |
| 2020/0166622 A1* | 5/2020 | Small | .................. | G01S 13/4454 |
| 2020/0314534 A1 | 10/2020 | Kobayashi et al. | | |

(Continued)

OTHER PUBLICATIONS

"Non-Final Office Action", U.S. Appl. No. 18/065,093, filed Dec. 19, 2024, 7 pages.

(Continued)

*Primary Examiner* — Alexander Krzystan
(74) *Attorney, Agent, or Firm* — FIG. 1 Patents

(57) ABSTRACT

In implementations, audio data packets of an audio stream are received by an audio output device. An audio drop of the audio stream is predicted based on an increase in path loss of signals exchanged between the audio output device and an audio source device, a decrease in the number of the signals that travel via reflected signal paths, and a threshold number of the signals being lost. Based on the audio drop prediction, broadcast signals are exchanged via multiple audio connections between multiple audio source devices and multiple audio output components of the audio output device. Further, an audio connection is selected based on signal strength data, time of arrival data, and signal loss data for each of the audio connections. A transfer of the audio stream is initiated to provide the audio data packets of the audio stream to the audio output device via the selected audio connection.

20 Claims, 10 Drawing Sheets

(56) References Cited

U.S. PATENT DOCUMENTS

| | | | | |
|---|---|---|---|---|
| 2020/0351586 | A1 | 11/2020 | Fei et al. | |
| 2020/0410976 | A1* | 12/2020 | Zhou | G06N 3/048 |
| 2021/0003660 | A1* | 1/2021 | Brede | G01S 11/06 |
| 2021/0282108 | A1* | 9/2021 | Smith | H04B 7/086 |
| 2022/0357419 | A1* | 11/2022 | Givehchian | G01S 13/878 |
| 2022/0358943 | A1* | 11/2022 | So | H04N 21/233 |
| 2022/0393776 | A1* | 12/2022 | Koul | H04B 17/309 |
| 2024/0196130 | A1 | 6/2024 | Agrawal et al. | |
| 2024/0196154 | A1 | 6/2024 | Sabatier et al. | |
| 2024/0241688 | A1* | 7/2024 | Russell | G06F 3/165 |
| 2024/0243779 | A1* | 7/2024 | Tan | H04B 7/04013 |

OTHER PUBLICATIONS

"Notice of Allowance", U.S. Appl. No. 18/065,093, filed Mar. 4, 2025, 5 pages.

"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy-smarttag-plus/>., May 11, 2021, 8 Pages.

"Car Connectivity Consortium", Car Connectivity Consortium [retrieved Jun. 28, 2021]. Retrieved from the Internet <https://carconnectivity. org/>., Feb. 22, 2018, 6 Pages.

"FiRa Consortium, Inc.", FiRa Consortium, Inc. [retrieved Jun. 28, 2021]. Retrieved from the Internet <https://www.firaconsortium. org/>., Aug. 1, 2019, 3 Pages.

"Hands-Free Profile 1.8", Bluetooth SIG, Inc. [retrieved Nov. 21, 2022]. Retrieved from the Internet <https://www.bluetooth.com/specifications/specs/hands-free-profile-1-8/>., Apr. 14, 2022, 139 Pages.

"IEEE Standard for Low-Rate Wireless Networks—Amendment 1: Enhanced Ultra Wideband (UWB) Physical Layers (PHYs) and Associated Ranging Techniques", IEEE 802.15.4z-2020 [retrieved Nov. 16, 2022]. Retrieved from the Internet <10.1109/IEEESTD.2020.9179124>., Aug. 25, 2020, 174 Pages.

"Proximity Profile (PXP)", Bluetooth SIG, Inc. [retrieved Nov. 18, 2022]. Retrieved from the Internet <https://www.bluetooth.com/specifications/specs/proximity-profile-1-0-1/>., Jan. 25, 2022, 11 Pages.

"Proximity Profile 1.0.1", Bluetooth SIG, Inc. [retrieved Nov. 18, 2022]. Retrieved from the Internet <https://www.bluetooth.com/specifications/specs/proximity-profile-1-0-1/>., Jul. 14, 2015, 20 Pages.

"Specifications Basic Audio Profile", Bluetooth SIG, Inc., Generic Audio Working Group [retrieved Nov. 21, 2022]. Retrieved from the Internet <https://www.bluetooth.com/specifications/bap-html/>., Jun. 21, 2022, 189 Pages.

"Test Suite (TS)", Bluetooth SIG, Inc. [retrieved Nov. 18, 2022]. Retrieved from the Internet <https://www.bluetooth.com/specifications/specs/proximity-profile-1-0-1/>., Jul. 29, 2019, 23 Pages.

"The proximity profile 1.0.1", Bluetooth SIG, Inc [retrieved Nov. 21, 2022]. Retrieved from the Internet <https://www.bluetooth.com/specifications/specs/proximity-profile-1-0-1/>., Jul. 14, 2015, 20 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

Agrawal, Amit Kumar, et al., "US Application as Filed", U.S. Appl. No. 18/065,093, filed Dec. 13, 2022, 42 pages.

Davis, Giles T, et al., "US Application as Filed", U.S. Appl. No. 17/708,410, filed Mar. 30, 2022, 61 pages.

Haselton, Todd, "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.

Pirch, Hans-Juergen, et al., "Introduction to Impulse Radio UWB Seamless Access Systems", FiRa Consortium [retrieved Jun. 28, 2021]. Retrieved from the Internet <https://www.firaconsortium. org/sites/default/files/2020-04/fira-introduction-impulse-radio-uwb-wp-en.pdf>., Feb. 2020, 15 Pages.

Russell, Michael E, et al., "US Application as Filed", U.S. Appl. No. 17/473,477, filed Sep. 13, 2021, 61 pages.

Russell, Michael E, et al., "US Application as Filed", U.S. Appl. No. 17/473,671, filed Sep. 13, 2021, 62 pages.

* cited by examiner

100

Audio Output Device 106

First Audio Output Component 118

Second Audio Output Component 120

Radio Devices 110c

Audio Drop Prediction Module 122c

Connection Selection Module 124c

120

118

108

116

First Audio Source Device 102

Audio Files 112a

Memory 114a

Radio Devices 110a

Audio Drop Prediction Module 122a

Connection Selection Module 124a

Second Audio Source Device 104

Audio Files 112b

Memory 114b

Radio Devices 110b

Audio Drop Prediction Module 122b

Connection Selection Module 124b

*Fig. 1*

200
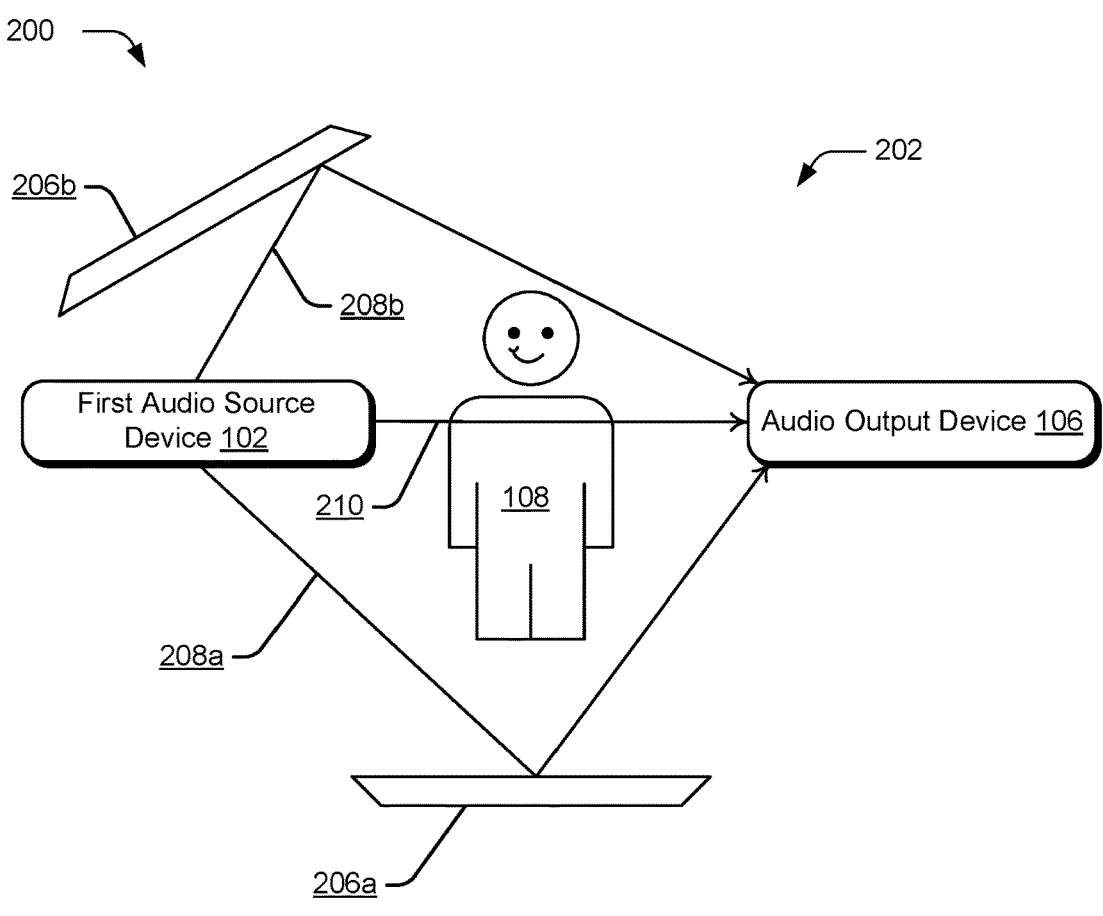
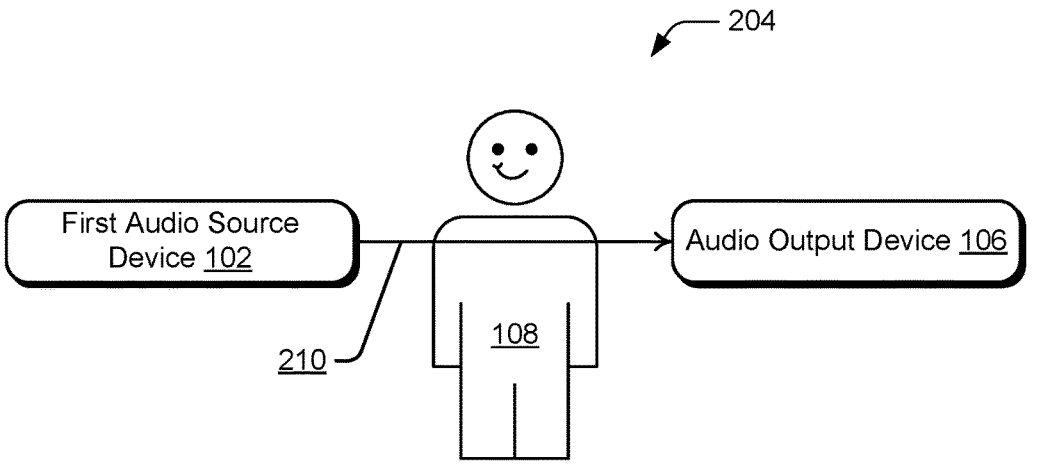
*Fig. 2*

300

Audio Path Signals 302

↓

Audio Output Device 106

Signal Strength Data 304

Time of Arrival Data 312

Signal Loss Data 318

Audio Drop Prediction Module 122

Path Loss Detector Module 306

Reflection Detector Module 310

Signal Loss Detector Module 316

Path Loss Increase 308

Reflection Decrease 314

Signal Loss Threshold 320

Audio Drop Prediction 322

400
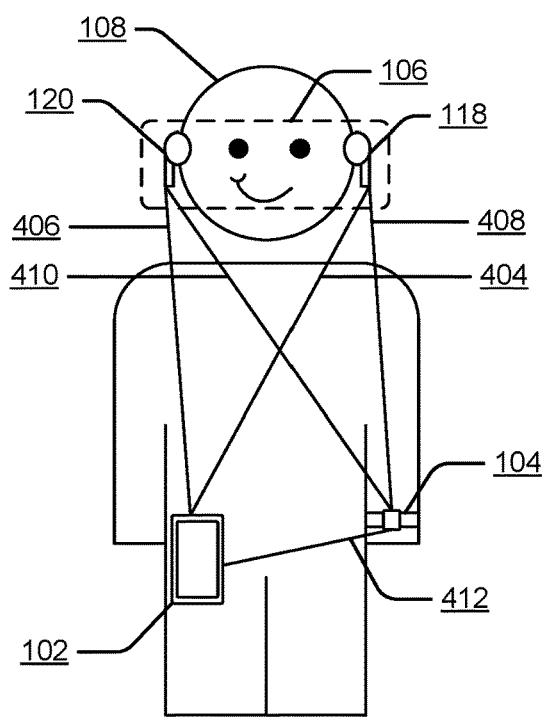
108
120
106
118
406
408
410
404
104
412
102
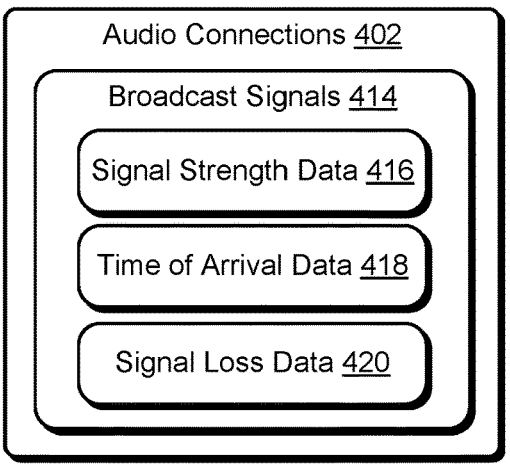
Audio Connections 402
Broadcast Signals 414
Signal Strength Data 416
Time of Arrival Data 418
Signal Loss Data 420
*Fig. 4*

500

Figure 8:
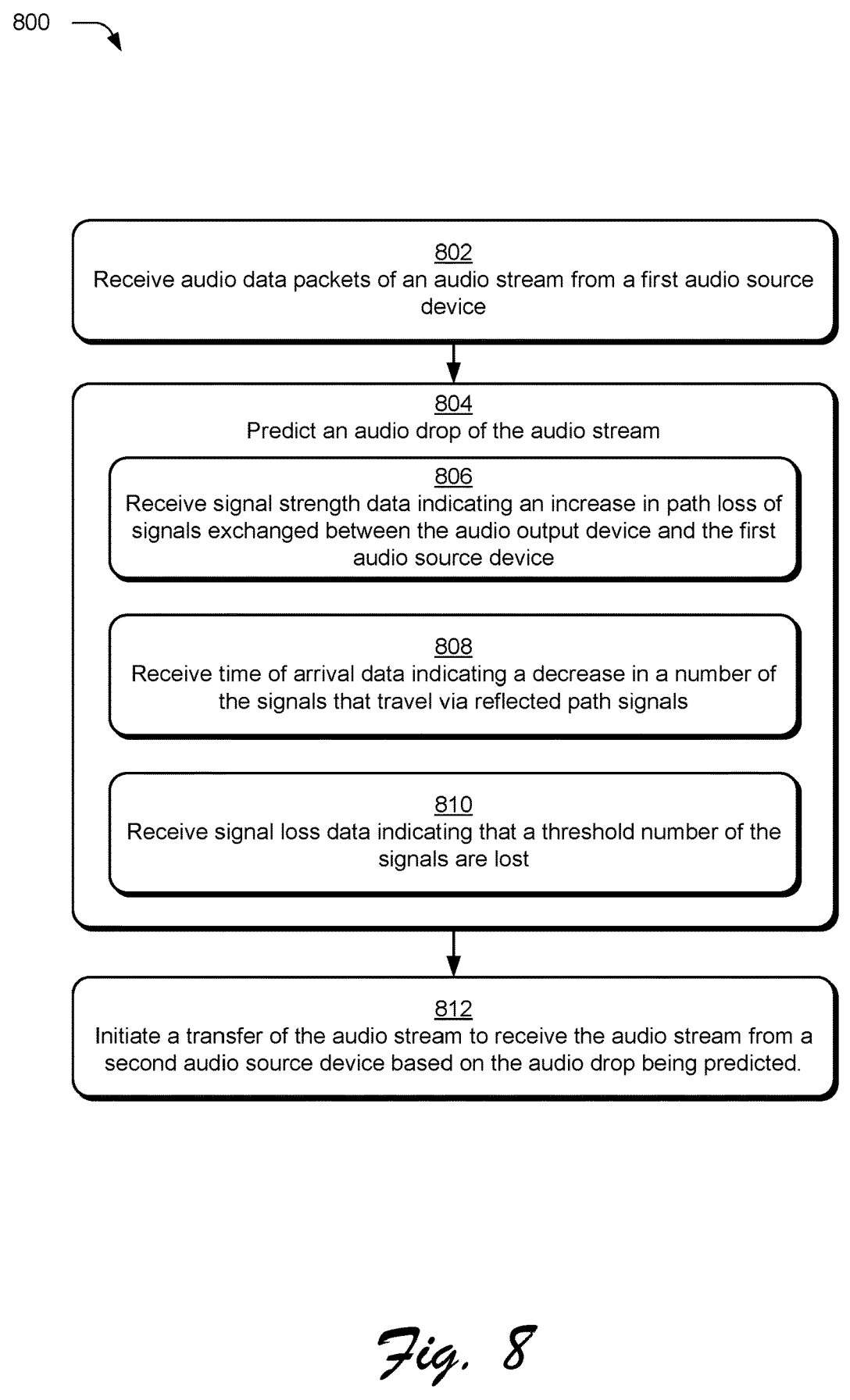

800

802
Receive audio data packets of an audio stream from a first audio source device

804
Predict an audio drop of the audio stream

806
Receive signal strength data indicating an increase in path loss of signals exchanged between the audio output device and the first audio source device

808
Receive time of arrival data indicating a decrease in a number of the signals that travel via reflected path signals

810
Receive signal loss data indicating that a threshold number of the signals are lost

812
Initiate a transfer of the audio stream to receive the audio stream from a second audio source device based on the audio drop being predicted.

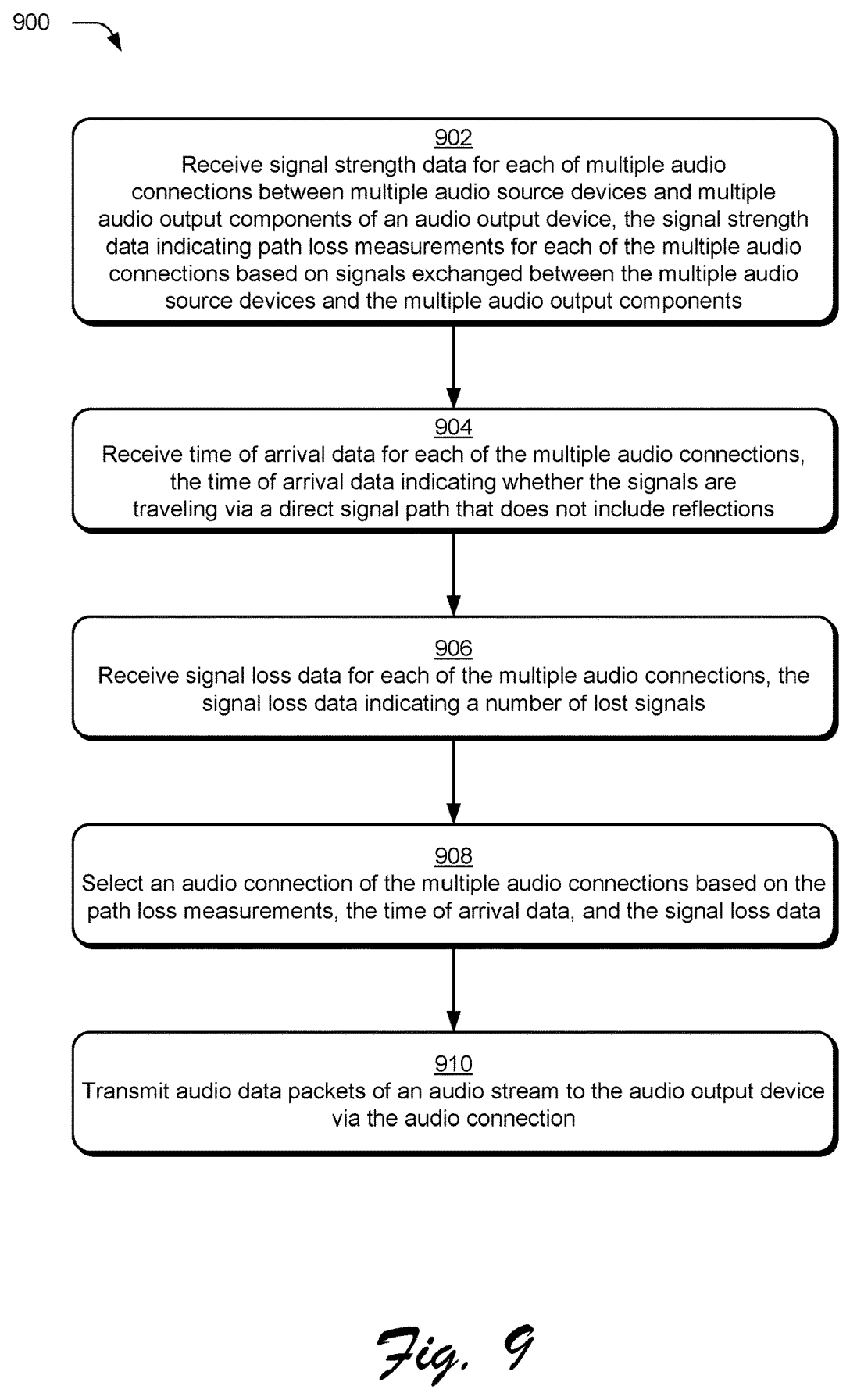

902
Receive signal strength data for each of multiple audio connections between multiple audio source devices and multiple audio output components of an audio output device, the signal strength data indicating path loss measurements for each of the multiple audio connections based on signals exchanged between the multiple audio source devices and the multiple audio output components

904
Receive time of arrival data for each of the multiple audio connections, the time of arrival data indicating whether the signals are traveling via a direct signal path that does not include reflections

906
Receive signal loss data for each of the multiple audio connections, the signal loss data indicating a number of lost signals

908
Select an audio connection of the multiple audio connections based on the path loss measurements, the time of arrival data, and the signal loss data

910
Transmit audio data packets of an audio stream to the audio output device via the audio connection

*Fig. 9*

AUDIO CONNECTION SELECTIONS BASED ON AUDIO DROP PREDICTIONS

BACKGROUND

Today's person is afforded a tremendous selection of devices that are capable of performing a multitude of tasks. For example, a typical mobile device (e.g., a smartphone, a laptop, a wearable device, etc.) includes wireless communication technology to communicate audio signals to a listening device (e.g., true wireless earbuds, wireless over-ear headphones, etc.) causing the listening device to output audio. The audio signals often experience path loss, which is a reduction in signal strength of the audio signals as the audio signals propagate through space. When audio signals travel through a lossy medium, the audio signals experience increased levels of path loss. As an example, path loss is increased in situations in which the mobile device is located in a left garment pocket of the user and is transmitting the audio signals to a receiver of the listening device that is located in a right ear of the user, thereby causing the audio signals to travel through the body of the user.

BRIEF DESCRIPTION OF THE DRAWINGS

Aspects of audio connection selections based on audio drop predictions are described with reference to the following Figures. The same numbers may be used throughout to reference similar features and components that are shown in the Figures. Further, identical numbers followed by different letters reference different instances of features and components described herein:

FIG. 1 illustrates an example environment in which aspects of audio connection selections based on audio drop predictions can be implemented:

FIG. 2 illustrates an example showing a multipath environment and a non-multipath environment in accordance with one or more implementations;

FIG. 4 depicts an example showing multiple possible audio connections;

FIG. 8 depicts an example procedure for audio connection selections based on audio drop predictions to initiate an audio stream transfer based on an audio drop prediction as implemented by an audio output device;

FIG. 9 depicts an example procedure for audio connection selections based on audio drop predictions to select an audio connection;

DETAILED DESCRIPTION

Figure 3:
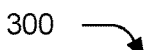
FIG. 3 depicts an example system in which aspects of audio connection selections based on audio drop predictions can be implemented to predict an audio drop.

Implementations of techniques for audio connection selections based on audio drop predictions are implemented as described herein. In accordance with the described techniques, a first audio source device, a second audio source device, and an audio output device are communicatively linked to one another, generally by wireless connection. By way of example, the first audio source device is a smartphone, the second audio source device is a smartwatch worn by a user, and the audio output device corresponds to true wireless earbuds having a first audio output component (e.g., a right earbud) and a second audio output component (e.g., a left earbud). In various examples, the devices are interconnected in a Bluetooth network to enable wireless communication of data between the devices. In one or more implementations, the first audio source device communicates audio data packets of an audio file as part of an audio stream to the audio output device, thereby causing the audio output device to output the audio stream. For example, the first audio source device communicates the audio data packets of the audio stream to a receiver of the first audio output component. Further, the first audio output component transmits the audio data packets to the second audio output component, thereby enabling concurrent output of the audio stream by both audio output devices.

In some situations, the audio stream is transmitted to the audio output device via a path that passes through a body of the user. By way of example, the first audio source device is located in a right garment pocket of the user, and the first audio output component is placed in a left ear of the user. Given this, audio data packets traveling along a direct signal path between the first audio source device and the first audio output component can experience a significant degree of path loss, which is a reduction in signal strength of a signal as it propagates through space. For at least these reasons, audio data packets that travel along the direct signal path are often lost, which can lead to audio drops (e.g., pops, clicks, stoppage, etc.) in the audio stream output by the audio output component.

A multipath environment is one in which walls and/or objects are in close proximity to the interconnected devices, and as such, the audio data packets of the audio stream often reach the audio output device via reflected signal paths. Since the audio data packets traveling along the reflected signal paths do not travel through the user's body, the audio data packets that arrive via the reflected signal paths are associated with a reduced path loss, as compared to the direct signal path. Therefore, audio drops resulting from the increased cross body path loss are often avoided when the user is in a multipath environment. In contrast, a non-multipath environment is one in which there are fewer walls and/or objects in close proximity to the interconnected devices, and as such, the audio data packets of the audio stream reach the audio output device via reflected signal paths at a reduced rate. Instead, the audio data packets reach the audio output device primarily via the direct signal path. Given this, the user often experiences audio drops due to the cross body path loss when in a non-multipath environment.

Accordingly, an audio drop prediction module (e.g., of any one or a combination of the interconnected devices) is employed to predict an audio drop of the audio stream due to path loss limitations (e.g., cross body path loss) in a non-multipath environment. In accordance with the described techniques, audio path signals are exchanged between the first audio source device that provides the audio stream and the first audio output component that receives the audio stream. In one or more implementations, the audio path signals are the audio data packets. Additionally or alternatively, the audio path signals are non-audio bearing signals, such as control signal packets, acknowledgement signals, UWB ranging signals, Bluetooth channel sounding signals, and the like.

The audio path signals include signal strength data. For example, the first audio source device transmits the audio path signals with an indication of transmitter power output, and the audio output device measures a received signal strength of the transmitted audio path signals. The signal strength data is provided to the audio drop prediction module, which determines path loss measurements for the audio path signals based on the signal strength data. Further, the audio drop prediction module detects an increase in the path loss measurements (e.g., as a threshold percentage of consecutively transmitted audio path signals having an increased path loss measurement).

Radio devices (e.g., Bluetooth radios) of the first audio source device and/or the audio output device further measure time of arrival data associated with the audio path signals. The time of arrival data, for instance, includes time-of-arrivals, time-difference-of-arrivals, and time-of-flights of the audio path signals. The time of arrival data is provided to the audio drop prediction module, which determines whether the audio path signals are traveling via the direct signal path and/or the reflected signal paths. By way of example, the time of arrival data is usable by the audio drop prediction module to determine a distance traveled by the audio path signals. Further, based on the distance traveled, the audio drop prediction module can determine whether the audio path signals travel along a shortest signal path (e.g., the direct signal path) or a path that is longer than the shortest signal path (e.g., the reflected signal paths).

The audio output device further collects signal loss data by monitoring a number of lost audio path signals (e.g., audio path signals that are transmitted, but are not received by the audio output device). The signal loss data is provided to the audio drop prediction module to determine whether the number of lost audio path signals exceeds a signal loss threshold. By way of example, the signal loss threshold is a threshold percentage of consecutively transmitted audio path signals that are lost.

Based on the path loss increase, the reflection decrease, and the number of lost audio path signals exceeding the signal loss threshold, the audio drop prediction module outputs an audio drop prediction. Further, the audio drop prediction module initiates a transfer of the audio stream to cause the audio data packets of the audio data file to be provided via a different audio connection. By way of example, multiple audio connections, via which the audio stream can be provided, are possible for the interconnected devices. For instance, the first audio output device or the second audio output device can provide the audio stream to the first audio output component or the second audio output component. Additionally or alternatively, the first audio output device can provide the audio stream to the second audio source device, and the audio stream can be relayed by the second audio source device to the audio output device. Based on the audio drop prediction, the audio drop prediction module instructs a connection selection module to select one of the audio connections via which the audio stream is to be provided.

To do so, the connection selection module instructs the interconnected devices to exchange broadcast signals via each of the multiple audio connections. The broadcast signals can be any one of a variety of different types of signals, such as control signal packets, acknowledgement signals, UWB ranging signals, and Bluetooth channel sounding signals. Any one or a combination of the interconnected devices can collect signal strength data, time of arrival data, and signal loss data associated with the broadcast signals transmitted via each of the multiple audio connections. The signal strength data (e.g., transmitter power output and received signal strength) is provided to the connection selection module, which determines path loss measurements for each of the audio connections based on the signal strength data. Furthermore, the time of arrival data (e.g., time-of-arrivals, time-difference-of-arrivals, time-of-flights) is provided to the connection selection module, which determines whether the broadcast signals are traveling via a direct signal path and/or reflected signal paths for each of the audio connections based on the time of arrival data. Moreover, the signal loss data indicating a number of lost broadcast signals for each of the audio connections is provided to the connection selection module.

The connection selection module generates signal scores for each of the audio connections based on the path loss measurements, the time of arrival data, and the signal loss data. For example, a higher signal score is determined for audio connections having reduced path loss measurements, a greater number of the broadcast signals traveling along the direct signal path, and a reduced number of the lost broadcast signals, as compared to other audio connections. Accordingly, the connection selection module selects the audio connection having the highest signal score from among the multiple audio connections, and initiates a transfer of the audio stream such that the audio data packets of the audio stream are provided to the audio output device via the selected audio connection.

Therefore, the described techniques predict that an audio drop is about to occur due to path loss limitations in a non-multipath environment. Further, the described techniques transfer the audio stream to be provided via a different audio connection for which audio drops are less likely to occur. Therefore, the described techniques reduce a number of audio drops experienced by the user, thereby improving user experience listening to the audio stream.

While features and concepts of the described techniques for audio connection selections based on audio drop predictions can be implemented in any number of different devices, systems, environments, and/or configurations, implementations of the techniques for audio connection selections based on audio drop predictions are described in the context of the following example devices, systems, and methods.

FIG. 1 illustrates an example environment 100 in which aspects of audio connection selections based on audio drop predictions can be implemented. The environment 100 includes a first audio source device 102, a second audio source device 104, and an audio output device 106. The first audio source device 102 and the second audio source device 104 may correspond to or include any type of mobile device such as a smartphone, a mobile phone, or other type of mobile wireless device. Alternatively or in addition, the first audio source device 102 and the second audio source device 104 may correspond to or include any type of wearable device such as a smart watch, a wearable 5G article, or any other type of wearable wireless device. Alternatively or in addition, the first audio source device 102 and the second audio source device 104 may correspond to or include any type of a wireless electronic, computing, and/or communication device, such as a laptop device, a tablet, a smart device, and so forth. In the example environment 100, the first audio source device 102 is depicted as a mobile smartphone and the second audio source device 104 is depicted as a smartwatch worn by a user 108.

The audio output device 106 is any type of device that is capable of wirelessly receiving audio, via a connection to one or more of the audio source devices 102, 104, and outputting the audio. In one or more examples, the audio output device 106 corresponds to or includes a listening device, such as true wireless earbuds, wireless over-ear headphones, wireless earbuds connected to one another via a wired connection, a wireless headset, a stereo, a speaker, etc. In the example environment 100, the audio output device 106 is depicted as a set of true wireless earbuds worn by the user 108. Thus, the devices 102, 104, 106 are configurable in a variety of ways that support audio connection selections based on audio drop predictions without departing from the spirit or scope of the described techniques.

In implementations, the first audio source device 102, the second audio source device 104, and the audio output device 106 are communicatively linked to one another, generally by wireless connection. As shown, each of the devices 102, 104, 106 include radio devices 110a, 110b, 110c. By way of example, each of the devices 102, 104, 106 include the radio devices 110a, 110b, 110c as ultra-wideband (UWB) radios, Bluetooth radios, and/or Wi-Fi radios. Thus, the devices 102, 104, 106 are interconnectable to enable inter-device communication using UWB, Bluetooth, and/or Wi-Fi.

In various examples, the devices 102, 104, 106 are Bluetooth-enabled devices including Bluetooth radios and are connected to one another in a Bluetooth network. In one or more implementations, the Bluetooth network is a piconet in which one device is the controller device, and other devices in the Bluetooth network are responder devices. In a specific example, the first audio source device 102 is the controller device, while the second audio source device 104 and the audio output device 106 are responder devices controlled by the first audio source device 102. Additionally or alternatively, the Bluetooth network is a scatternet that includes two or more piconets. In a specific example, the first audio source device 102 is the controller device of a first piconet, in which the second audio source device 104 and the audio output device 106 are responder devices controlled by the first audio source device 102. Additionally, the second audio source device 104 is the controller device of a second piconet, in which the audio output device 106 and/or other interconnected devices are responder devices controlled by the second audio source device 104. It is to be appreciated that the roles of controller device and responder device are readily switchable, and each of the devices 102, 104, 106 can act as the controller device or the responder device in variations.

As shown, the first audio source device 102 includes audio files 112a, which in some implementations, are stored in memory 114a of the first audio source device 102. Additionally or alternatively, the second audio source device 104 includes audio files 112b, which in some implementations, are stored in memory 114b of the second audio source device 104. Notably, the audio files 112a can include the same and/or different audio files as the audio files 112b. Since the devices are interconnected in a Bluetooth network, the first audio source device 102 can communicate the audio files 112a for playback at one or more of the other devices 104, 106. Further, the second audio source device 104 can communicate the audio files 112b for playback at one or more of the other devices 102, 106. As shown in the example environment 100, for instance, the first audio source device 102 communicates audio data packets of an audio file as part of an audio stream 116 to the audio output device 106, thereby causing the audio output device 106 to output the audio stream 116. Additionally or alternatively, audio files can be obtained by the first or second audio source device 102, 104 from a network connected source, such as a web browser or a content streaming application, and provided to the audio output device 106. Accordingly, in variations, one or more audio files are obtained for playback at the audio output device 106 without being stored locally on the audio source devices 102, 104.

In one or more implementations, the audio output device 106 corresponds to or includes true wireless earbuds including a first audio output component 118 and a second audio output component 120. The audio output components 118, 120 each include a receiver to receive the audio data packets of the audio stream 116 and a transmitter to transmit the audio data packets of the audio stream 116 (e.g., to the other audio output component). Thus, in the environment 100, the first audio output component 118 acts as a primary rendering device to receive the audio stream 116, via the receiver, and transmit the audio stream 116, via the transmitter, to the second audio output component 120. This enables the first and second audio output components 118, 120 to concurrently output the audio stream 116. In variations, the second audio output component 120 can act as the primary rendering device to receive the audio data packets of the audio stream 116, via the receiver, and transmit the audio stream 116, via the transmitter, to the first audio output component 118.

For the foregoing reasons, multiple audio connections are possible in the environment 100 via which the audio stream 116 can be provided to the audio output device 106. By way of example, the first audio source device 102 can communicate the audio stream 116 to the first audio output component 118 or the second audio output component 120 for output by the audio output device 106. Further, the second audio source device 104 can communicate the audio stream 116 to the first audio output component 118 or the second audio output component 120 for output by the audio output device 106. Additionally or alternatively, the audio stream can be communicated between the audio source devices 102, 104 and relayed by a receiving audio source device to the audio output device 106.

As shown in the example environment, the audio stream 116 is often transmitted to the audio output device 106 via a path that crosses a body of the user 108. For example, the first audio source device 102 is located on one side of a body of the user 108, while the first audio output component 118 is located on a different side of the body of the user 108. Given this, audio data packets of the audio stream 116 traveling along a direct signal path between the first audio source device 102 and the first audio output component 118 can experience a significant degree of path loss. Broadly, path loss is the reduction in signal strength of a signal as it propagates through space, and increases when the signal passes through a lossy medium (e.g., a body of the user 108). Oftentimes, the cross body path loss is significant enough to exceed link budget limitations for the Bluetooth audio connection between the first audio source device 102 and the audio output device 106. Given this, audio data packets that travel along the direct signal path are often lost, which can lead to audio drops (e.g., pops, clicks, skips, stoppage, etc.) in the audio stream 116 output by the audio output device 106.

Notably, a multipath environment is an environment that includes walls or other objects that are in close proximity to the interconnected devices 102, 104, 106 off which the audio data packets can reflect. Thus, when the user 108 is in a multipath environment, the audio data packets of the audio stream 116 often arrive at the the audio output device 106 via reflected signal paths as well as via the direct signal path. Since the audio data packets arriving via the reflected signal paths do not travel through the user's body, the audio data packets that arrive via the reflected signal paths are associated with a reduced path loss as compared to the audio data packets that arrive via the direct signal path. Thus, audio drops resulting from the path loss are often avoided in a multipath environment since the audio data packets are also received via the reflected signal paths.

Moreover, a non-multipath environment is an environment with little to no walls or objects in close proximity to the interconnected devices 102, 104, 106 off which the audio data packets can reflect. Therefore, when the user is in a non-multipath environment, the audio data packets arrive at the audio output device 106 via the reflected signal paths at a reduced rate. Instead, the audio data packets primarily arrive at the audio output device 106 via the direct signal path. As a result, the user 108 often experiences audio drops due to the cross body path loss (or other path loss limitations) when in a non-multipath environment.

To reduce audio drops as a result of cross body path loss or other path loss limitations in a non-multipath environment, techniques are described for audio connection selections based on audio drop predictions. In the illustrated example, an audio drop prediction module 122a is implemented by the first audio source device 102 to predict an audio drop of the audio stream 116. Although described in the following example as implemented by the first audio source device 102, it is to be appreciated that the second audio source device 104 and the audio output device 106 can predict an audio drop of the audio stream 116 using similar techniques, as illustrated by inclusion of the audio drop prediction modules 122b, 122c, as components of the devices 104, 106, respectively.

In accordance with the described techniques, the audio output device 106 receives (e.g., via the first audio output component 118) the audio data packets of the audio stream 116 from the first audio source device 102. Furthermore, audio path signals are exchanged between the first audio source device 102 which transmits the audio stream 116 and the first audio output component 118 that receives the audio stream 116. In some implementations, the audio path signals are the audio data packets. Additionally or alternatively, the audio path signals are non-audio bearing signals, such as control signal packets, acknowledgement signals, UWB ranging signals, Bluetooth channel sounding signals, and the like.

In implementations, the audio output device 106 collects signal strength data, time of arrival data, and signal loss data associated with the received audio path signals, which are provided to the audio drop prediction module 122a. Using the signal strength data, the audio drop prediction module 122a determines path loss measurements for the audio path signals. Using the time of arrival data, the audio drop prediction module 122a determines whether the audio path signals are traveling via the direct signal path and/or the reflected signal paths. Using the signal loss data, the audio drop prediction module 122a determines whether a threshold number of audio path signals are lost. Based on a path loss increase in the path loss measurements, a decrease in a number of audio path signals that are traveling via the reflected signal paths, and at least the threshold number of the audio path signals being lost, the audio drop prediction module 122a predicts that an audio drop of the audio stream 116 is about to occur due to path loss limitations in a non-multipath environment. Further, the audio drop prediction module 122a initiates a transfer of the audio stream 116 so that the audio stream 116 is provided via a different one of multiple audio connections.

To do so, the audio drop prediction module 122a instructs a connection selection module 124a of the first audio source device 102 to select one of the audio connections. Further, the connection selection module 124a transfers the audio stream to the selected audio connection such that the audio stream is provided to the audio output device via the selected audio connection, rather than a previous audio connection. Although described in the following example as implemented by the first audio source device 102, it is to be appreciated that the second audio source device 104 and the audio output device 106 can select an audio connection from among the multiple audio connections using similar techniques, as illustrated by inclusion of the connection selection modules 124b, 124c as components of the devices 104, 106, respectively.

In accordance with the described techniques, the connection selection module 124a instructs the devices 102, 104, 106 to exchange broadcast signals via each of the multiple audio connections. The broadcast signals can be any one of a variety of different types of signals, such as control signal packets, acknowledgement signals, UWB ranging signals, and Bluetooth channel sounding signals. The radio devices 110a, 110c, 110b of any one or a combination of the devices 102, 104, 106 can collect signal strength data, time of arrival data, and signal loss data associated with the broadcast signals transmitted via each of the audio connections, which are provided to the connection selection module 124a. The connection selection module 124a determines path loss measurements associated with each of the audio connections based on the signal strength data. Further, the connection selection module 124a determines whether the broadcast signals are traveling along reflected signal paths and/or a direct signal path for each of the audio connections. Moreover, the connection selection module 124a receives the signal loss data indicating a number of lost broadcast signals for each of the audio connections.

Based on the path loss measurements, the time of arrival data, and the number of lost broadcast signals, the connection selection module 124a determines a signal score for each of the audio connections. Broadly, a higher signal score is determined for audio connections having decreased path loss measurements, a greater number of the broadcast signals traveling along the direct signal path, and a reduced number of the lost broadcast signals in comparison to other audio connections. The connection selection module 124a selects the audio connection having a highest signal score and causes the audio stream 116 to be provided to the audio output device 106 via the selected audio connection. By doing so, the described techniques reduce audio drops in the audio stream 116, thereby improving user experience listening to the audio stream 116

FIG. 2 illustrates an example 200 showing a multipath environment 202 and a non-multipath environment 204 in accordance with one or more implementations. As shown in the multipath environment 202, signals (e.g., the audio data packets of the audio stream 116) are transmitted from the first audio source device 102 to the audio output device 106. Notably, the example multipath environment 202 includes reflectors 206a, 206b off which the signals can reflect and ultimately reach the audio output device 106. Therefore, in the example multipath environment 202, signals (e.g., the audio data packets of the audio stream 116) arrive at the audio output device 106 via reflected signal paths 208a, 208b.

Additionally, the signals arrive at the audio output device 106 via a direct signal path 210 between the first audio source device 102 and the audio output device 106 in the multipath environment 202. As shown, the first audio source device 102 and the audio output device 106 are located on opposite sides of the body of the user 108, and as such, the signals traveling along the direct signal path 210 pass through the user's body. As shown, a signal that arrives via the direct signal path 210 travels a shorter distance than a signal that arrives via the reflected signal paths 208a, 208b. Further, a signal that arrives via the direct signal path 210 has a reduced received signal strength as compared to a signal that arrives via the reflected signal paths 208a, 208b due to the cross body path loss associated with the direct signal path 210. In one or more implementations in which the signals are audio data packets of the audio stream 116, the cross body path loss is significant enough to cause one or more audio data packets not to reach the audio output device 106 via the direct signal path 210. However, since the audio data packets are also traveling along the reflected signal paths 208a, 208b, audio drops are less likely to occur in the multipath environment 202.

In the non-multipath environment 204, the signals (e.g., audio data packets of the audio stream) are similarly transmitted from the first audio source device 102 to the audio output device 106. However, in the non-multipath environment 204, there are no reflectors 206a, 206b off which the signals can reflect. As a result, the signals only travel along the direct signal path 210 in the non-multipath environment 204. As previously noted, in implementations in which the signals are audio data packets of the audio stream 116, the cross body path loss can be significant enough to cause the audio data packets traveling along the direct signal path 210 to not reach the audio output device 106. Since there are no reflected signal paths in the non-multipath environment 204, the lost audio data packets transmitted via the direct signal path 210 often cause audio drops, experienced by the user 108 as skips and/or stoppage in the audio stream 116 output by the audio output device 106.

FIG. 3 depicts an example system 300 in which aspects of audio connection selections based on audio drop predictions can be implemented to predict an audio drop. As shown, the example system 300 includes an audio drop prediction module 122, which can be any one or a combination of the audio drop prediction modules 122a, 122b, 122c of the devices 102, 104, 106. As shown, the audio output device 106 receives audio path signals 302 (e.g., from the first audio source device 102 that is providing the audio stream 116 to the audio output device 106). The audio path signals 302, in some implementations, are the audio data packets of the audio stream 116. Additionally or alternatively, the audio path signals 302 are non-audio bearing signals, such as control signal packets, acknowledgement signals, UWB ranging signals, Bluetooth channel sounding signals, and the like. The audio data packets and the non-audio bearing signals usable to predict an audio drop are referred to herein collectively as "audio path signals" since the audio data packets and the non-audio bearing signals are provided along an audio connection of the audio stream 116.

In accordance with the described techniques, the audio output device 106 collects signal strength data 304 for the audio path signals 302. For example, the first audio source device 102 that is providing the audio stream 116 to the audio output device 106 encodes each respective audio path signal 302 with a transmitter power output, which is the amount of power with which the audio path signal 302 is transmitted by the radio devices 110a of the first audio source device 102. Further, the radio devices 110c of the audio output device 106 measure the received signal strength (e.g., RSSI) of the received audio path signals 302. The signal strength data 304 is provided to a path loss detector module 306 of the audio drop prediction module 122 to determine path loss measurements associated with the audio path signals 302. To determine a path loss measurement of a respective audio path signal 302, for instance, the path loss detector module 306 calculates the difference between the transmitter power output and the received signal strength of the respective audio path signal 302.

In one or more implementations, the transmitter power output of the audio path signals 302 is not encoded in the transmitted audio path signals (e.g., the transmitter power output is not encodable for a particular type of audio path signal 302). In these implementations, a fixed power output can be utilized to determine the path loss measurements instead of the transmitted power output. Notably, the fixed power output is based on the type of radio device 110a, 110b, that is communicating the audio path signals 302.

As part of determining that an audio drop is likely to occur due to path loss limitations in a non-multipath environment, the path loss detector module 306 detects a path loss increase 308 in the path loss measurements of the audio path signals 302. As previously noted, when the devices 102, 106 transition to a non-multipath environment, the audio path signals 302 arrive at the audio output device 106 via the reflected signal paths 208a, 208b less frequently. Since the reflected signal paths 208a, 208b are associated with a reduced path loss as compared to the direct signal path 210, the path loss associated with the audio path signals 302 increases when the user transitions to a non-multipath environment.

However, an increase in path loss can occur for a number of reasons other than the devices 102, 106 transitioning to a non-multipath environment. For example, path loss can rapidly increase and decrease when the user 108 is walking and a swinging arm of the user 108 repeatedly intercepts the direct signal path 210 between the first audio source device 102 and the audio output device 106. Moreover, path loss can rapidly increase and decrease when the user 108 is handling the first audio source device 102 and a hand of the user 108 covers the radio devices 110a of the first audio source device 102. In contrast, when transitioning to a non-multipath environment, the path loss typically increases and remains at an increased path loss level.

Given this, the path loss increase 308 is detected as a threshold percentage of consecutively transmitted audio path signals 302 that are associated with an increased path loss measurement. For example, the path loss increase 308 is detected as at least 50% of a particular number of consecutively transmitted audio path signals 302 that have a path loss measurement that exceeds a baseline path loss by at least 20 decibels. Additionally or alternatively, the path loss increase 308 is detected as a threshold percentage of consecutively transmitted audio path signals 302 that have a path loss measurement that is within a particular range of path loss values. In an example, cross body path loss is typically measured at around 70-90 decibels, and as such, the path loss increase is detected as at least 50% of a particular number of consecutively transmitted audio path signals 302 having a path loss measurement within a range between 70 and 90 decibels.

Detecting the path loss increase 308 as an increase in path loss and a subsequent stabilization of the path loss at the increased level may be insufficient to conclude that the path loss increase 308 is due to a transition to a non-multipath environment. For instance, the path loss can increase and remain at an increased level when the first audio source device 102 and the audio output device 106 have moved out of range of one another. Due to this, a reflection detector module 310 is employed to determine whether the audio path signals 302 arrive at the audio output device 106 via the reflected signal paths 208a, 208b and/or the direct signal path 210.

In a first example in which the audio path signals 302 are the audio data packets, the radio devices 110a, 110c (e.g., the Bluetooth radios) of the first audio source device 102 and/or the audio output device 106 collect time of arrival data 312 associated with the audio data packets. The time of arrival data 312 includes time-of-arrivals of the audio data packets, time-difference-of arrivals of the audio data packets, and/or time-of-flights of the audio data packets. Broadly, the time-of arrivals indicate an absolute time at which the audio data packets are received, and the time-difference-of-arrivals indicate a time difference between consecutively received audio data packets. Further, the time-of-flight indicates a time period between when a respective audio data packet is transmitted and when the respective audio data packet is received. The time of arrival data 312 is communicated to the audio drop prediction module 122, which employs the reflection detector module 310 to determine a distance traveled by the audio data packets using the time of arrival data 312. By way of example, the reflection detector module 310 determines a distance traveled by a respective audio data packet by multiplying a known speed at which the audio data packet travels by the time-of-flight.

In a second example in which the audio path signals are UWB ranging signals, the radio devices 110a, 110b, 110c (e.g., the UWB radios) of the devices 102, 104, 106 exchange ranging signals as part of a UWB ranging session to determine time of arrival data 312 associated with the ranging signals. For instance, UWB ranging signals can be exchanged between the first audio source device 102 and the audio output device 106 as part of a UWB ranging session. In this second example, the UWB ranging signals are non-audio bearing signals, and as such, are transmitted out-of-band in relation to the audio data packets. The first audio source device 102 and/or the audio output device 106, for example, collect time-of-arrivals, time-difference-of-arrivals, and time-of-flights of the ranging signals, which can be used to determine a distance traveled by the ranging signals. In a one-way ranging session, for instance, the time-difference-of-arrivals of the ranging signals are utilized by UWB radios of the first audio source device 102 and/or the audio output device 106 to determine a distance traveled by the ranging signals, in accordance with IEEE standard 802.15.4z. In a two-way ranging session, for instance, the time-of-flights of the ranging signals are utilized by UWB radios of the first audio source device 102 and/or the audio output device 106 to determine a distance traveled by the ranging signals, in accordance with IEEE standard 802.15.4z. The time of arrival data 312, including the distance traveled by the ranging signals, is provided to the reflection detector module 310 of the audio drop prediction module 122.

In a third example in which the audio path signals 302 are Bluetooth channel sounding signals, the radio devices 110a, 110b, 110c (e.g., the Bluetooth radios) of the devices 102, 104, 106 exchange channel sounding signals as part of a Bluetooth Low Energy (e.g., BLE) channel sounding distance estimation session to determine time of arrival data 312 associated with the channel sounding signals. For instance, channel sounding signals are exchanged between the first audio source device 102 and the audio output device

106 as part of a BLE channel sounding distance estimation session. In this third example, the channel sounding signals are non-audio bearing signals, and as such, are transmitted out-of-band in relation to the audio data packets. As part of a channel sounding distance estimation session, for instance, the first audio source device 102 and/or the audio output device 106 collect time-of-departures of the channel sounding signals and time-of-arrivals of the channel sounding signals. Further, time-of-flights for the channel sounding signals are determined based on differences between the time-of-departures and the time-of-arrivals. A distance traveled by a respective channel sounding signal can be determined by multiplying the time-of-flight by a known speed at which the channel sounding signal travels. The time of arrival data 312, including the distance traveled by the channel sounding signals, is provided to the reflection detector module 310 of the audio drop prediction module 122. Notably, the distance traveled by the ranging signals and the channel sounding signals corresponds to a distance traveled by the audio data packets since the first audio source device 102 and the audio output device 106 are a same distance away regardless of the ranging technique used.

Using the distance traveled, the reflection detector module 310 detects whether the audio path signals 302 are arriving via the direct signal path 210 and/or the reflected signal paths 208a, 208b. In one or more implementations, the reflection detector module 310 determines that an audio path signal 302 arrives via the direct signal path 210 if the distance traveled by the audio path signal 302 corresponds to a shortest path between the first audio source device 102 and the audio output device 106. Further, the reflection detector module 310 determines that an audio path signal 302 arrives via one of the reflected signal paths 208a, 208b if the distance traveled by the audio path signal is greater than the shortest path between the first audio source device 102 and the audio output device 106. Consider an example in which the first audio source device 102 and the first audio output component 118 are three feet away. In this example, the reflection detector module 310 determines that an audio path signal 302 arrives via the direct signal path 210 if the distance traveled by the audio path signal 302 is three feet (accounting for a margin of error). Further, the reflection detector module 310 determines that an audio path signal 302 arrives via one of the reflected signal paths 208a, 208b if the distance traveled is greater than three feet (accounting for a margin of error).

As part of determining that an audio drop is likely to occur due to a transition to a non-multipath environment, the reflection detector module 310 detects a reflection decrease 314 in the time of arrival data 312. The reflection decrease 314 detected in the the the audio path signals 302 indicates that the audio data packets arrive at the audio output device 106 via the reflected signal paths 208a, 208b at a reduced rate, and instead, primarily arrive at the audio output device 106 via the direct signal path 210. In one or more implementations, the reflection decrease 314 is detected as a threshold percentage of a particular number of consecutively transmitted audio path signals 302 not arriving at the audio output device 106 via the reflected signal paths 208a, 208b.

The path loss increase 308 and the reflection decrease 314 may be insufficient to predict that an audio drop is likely to occur. Indeed, although the path loss is increased along the direct signal path 210 and fewer audio data packets are arriving via the reflected signal paths 208a, 208b, the path loss may not be significant enough to cause an audio drop. In one or more implementations, the audio output device 106 implements a packet loss concealment algorithm. Broadly, the packet loss concealment algorithm mitigates the impact of lost audio data packets by smoothing out the audio stream 116. By doing so, the user 108 does not experience audio drops if fewer than a particular number or percentage of consecutively transmitted audio data packets are lost. However, once audio drops are experienced by the user 108 multiple audio data packets have already been lost.

Given this, a signal loss detector module 316 of the audio drop prediction module 122 is employed to determine that an audio drop is likely to occur before the user experiences an audio drop. To do so, the audio output device 106 collects signal loss data 318 by monitoring a number of the audio path signals 302 that are lost (e.g., audio path signals 302 that are transmitted, but do not arrive at the audio output device 106). In some examples in which the audio path signals 302 are the audio data packets, the audio output device 106 monitors a number of lost audio data packets based on a packet retransmission count, packet boundary flag, and/or flush timeout associated with the audio stream 116. In a specific example in which the number of lost audio data packets is monitored based on a flush timeout, the audio data packets are transmitted at regular timeout intervals, and the audio output device 106 receives an audio data packet once within every flush timeout interval. If an audio data packet is not received within a flush timeout interval, then the audio data packet is considered lost. To ensure that the lost audio data packets begin to be counted when the first audio data packet is lost rather than when the lost audio data packets cause an audio drop, the number of lost audio data packets can be monitored at a logical link control adaptation protocol (L2CAP) layer of the audio output device 106. Although the above example is described in relation to monitoring a number of audio data packets that are lost, it is to be appreciated that the audio output device 106 can monitor a number of lost non-audio bearing signals using similar techniques.

The signal loss data 318 is provided to the signal loss detector module 316, which determines whether the number of lost audio path signals 302 exceeds a signal loss threshold 320. In one example, the signal loss threshold 320 is a number of consecutively transmitted audio path signals 302 that are lost. In an additional example, the signal loss threshold 320 is a threshold percentage of consecutively transmitted audio path signals 302 that are lost. In one or more implementations, the signal loss threshold 320 is less than a maximum number of lost audio data packets that can be mitigated by the packet loss concealment algorithm. Given this, the signal loss detector module 316 determines that an audio drop is likely to occur before the user 108 experiences an audio drop in the audio stream 116.

Based on the path loss increase 308, the reflection decrease 314, and the number of lost audio path signals 302 exceeding the signal loss threshold 320, the audio drop prediction module 122 outputs an audio drop prediction 322. Notably, the audio drop prediction 322 is not just a prediction that an audio drop is likely to occur. Rather, the audio drop prediction 322 is a prediction that an audio drop is about to occur due to path loss limitations (e.g., cross body path loss) in a non-multipath environment. For example, the path loss increase 308 indicates that the path loss of the audio stream 116 is increasing and could be a result of the devices 102, 106 transitioning to a non-multipath environment. Further, the reflection decrease 314 confirms that the devices 102, 106 are transitioning to a non-multipath environment. Moreover, the number of lost audio path signals 302 exceeding the signal loss threshold 320 indicates that an audio drop is likely to occur due to the above-noted factors.

Notably, audio drops due to path loss limitations in a non-multipath environment can be avoided by providing the audio stream 116 via a different one of the audio connections. By way of example, initiating a transfer of the audio stream 116 to cause the audio stream 116 to be provided via an audio connection having a direct signal path that does not include an intercepting lossy medium can prevent audio drops from occurring. Thus, by generating the audio drop prediction 322 based on the above-noted factors, the audio drop prediction 322 indicates that audio drops can be prevented by initiating a transfer of the audio stream. Furthermore, since the signal loss detector module 316 determines that an audio drop is likely to occur before the audio drop is experienced by the user 108, the audio drop prediction module 122 can instruct a connection selection module 124a, 124b, 124c to connect a different audio connection before the audio drop is experienced by the user, as further discussed below.

In addition or as an alternative to causing the audio stream 116 to be provided via a different audio connection, the audio drop prediction module 122 can prevent audio drops in the audio stream 116 by reducing the data transmission rate for the audio stream 116. By reducing the data transmission rate, receiver sensitivity is increased for the receiving radio devices 110c of the audio output device 106. Further, since receiver sensitivity is increased, the radio devices 110c can successfully receive audio data packets associated with increased levels of path loss, thereby reducing audio drops in the audio stream 116.

Additionally or alternatively, the audio drop prediction module 122 can display a notification on a display of one or more of the audio source devices 102, 104. The notification, for instance, can notify the user 108 of the audio drop prediction 322, and prompt the user 108 to initiate an audio stream via a different audio connection. Additionally or alternatively, the notification can prompt the user 108 to physically move the first audio source device 102 to a location that is less likely to experience audio drops due to path loss limitations in a non-multipath environment. For example, the notification can prompt the user 108 to move the first audio source device 102 to a garment pocket located on a different side of the user's body.

FIG. 4 depicts an example 400 showing multiple possible audio connections. As shown, the example 400 includes the first audio source device 102 located on a right side of the user 108 (e.g., in a right pocket of a bottom garment of the user 108), the second audio source device 104 located on a left side of the user 108 (e.g., worn on a left wrist of the user 108), the first audio output component 118 located on the left side of the user 108 (e.g., placed in a left ear of the user 108), and the second audio output component 120 located on the right side of the user (e.g., placed in a right ear of the user 108).

Further, the example 400 includes multiple possible audio connections 402 via which the audio stream 116 can be provided to the audio output device 106. As shown, the audio connections 402 include a first audio connection 404 between the first audio source device 102 and the first audio output component 118, a second audio connection 406 between the first audio source device 102 and the second audio output component 120, a third audio connection 408 between the second audio source device 104 and the first audio output component 118, and a fourth audio connection 410 between the second audio source device 104 and the second audio output component 120. Additionally, a fifth audio connection 412 is possible between the first audio source device 102 and the second audio source device 104.

The fifth audio connection 412, for example, enables one of the devices 102, 104 to receive the audio stream 116 from the other one of the devices 102, 104 and relay the audio stream to the audio output device 106 (e.g., via one of the other audio connections 404, 406, 408, 410).

In one or more implementations, one or more of the connection selection modules 124a, 124b, 124c receive the audio drop prediction 322 as output by the audio drop prediction module 122, and in response, initiate the devices 102, 104, 106 to exchange broadcast signals 414 via each of the audio connections 402. The broadcast signals 414 can be any one of a variety of different types of signals, such as control signal packets, acknowledgement signals, UWB ranging signals, and Bluetooth channel sounding signals. By way of example, the radio devices 110a, 110b of the audio source devices 102, 104 transmit the broadcast signals 414 to the audio output device 106 via each of the audio connections 404, 406, 408, 410. Further, the radio devices 110a of the first audio source device 102 transmits broadcast signals 414 to the second audio source device 104 via the audio connection 412. In contrast to the audio path signals 302, which are transmitted via an audio connection of the audio stream 116, the broadcast signals 414 are broadcast via multiple audio connections 402.

Any one or a combination of the devices 102, 104, 106 can collect signal strength data 416 associated with the broadcast signals 414 exchanged via each of the audio connections 402. For example, the audio source devices 102, 104 encode the broadcast signals 414 with a transmitter power output, indicating an amount of power with which the broadcast signals 414 are transmitted by the audio source devices 102, 104. Further, the radio devices 110c of the audio output device 106 measure the received signal strength (e.g., RSSI) of the received broadcast signals 414 transmitted via the audio connections 404, 406, 408, 410. Moreover, the radio devices 110b of the second audio source device 104 measure the receives signal strength (e.g., RSSI) of the received broadcast signals 414 transmitted via the audio connection 412.

Any one or a combination of the devices 102, 104, 106 can collect time of arrival data 418 associated with the broadcast signals 414 transmitted via each of the audio connections 402. By way of example, the radio devices 110a, 110b, 110c of any one or a combination of the devices 102, 104, 106 can measure time-of-arrivals, time-difference-of-arrivals, and time-of-flights of the broadcast signals 414 transmitted via each of the audio connections 402.

Any one or a combination of the devices 102, 104, 106 can collect signal loss data 420 associated with the broadcast signals 414 transmitted via each of the audio connections 402. By way of example, the audio output device 106 can monitor a number of lost broadcast signals 414 transmitted via the audio connections 404, 406, 408, 410, using techniques similar to those described above with reference to FIG. 3. Further, the second audio source device 104 can monitor a number of lost broadcast signals 414 transmitted via the audio connection 412, using techniques similar to those described with reference to FIG. 3. Therefore, signal strength data 416, time of arrival data 418, and signal loss data 420 are determined for each of the audio connections 402.

Figure 5:
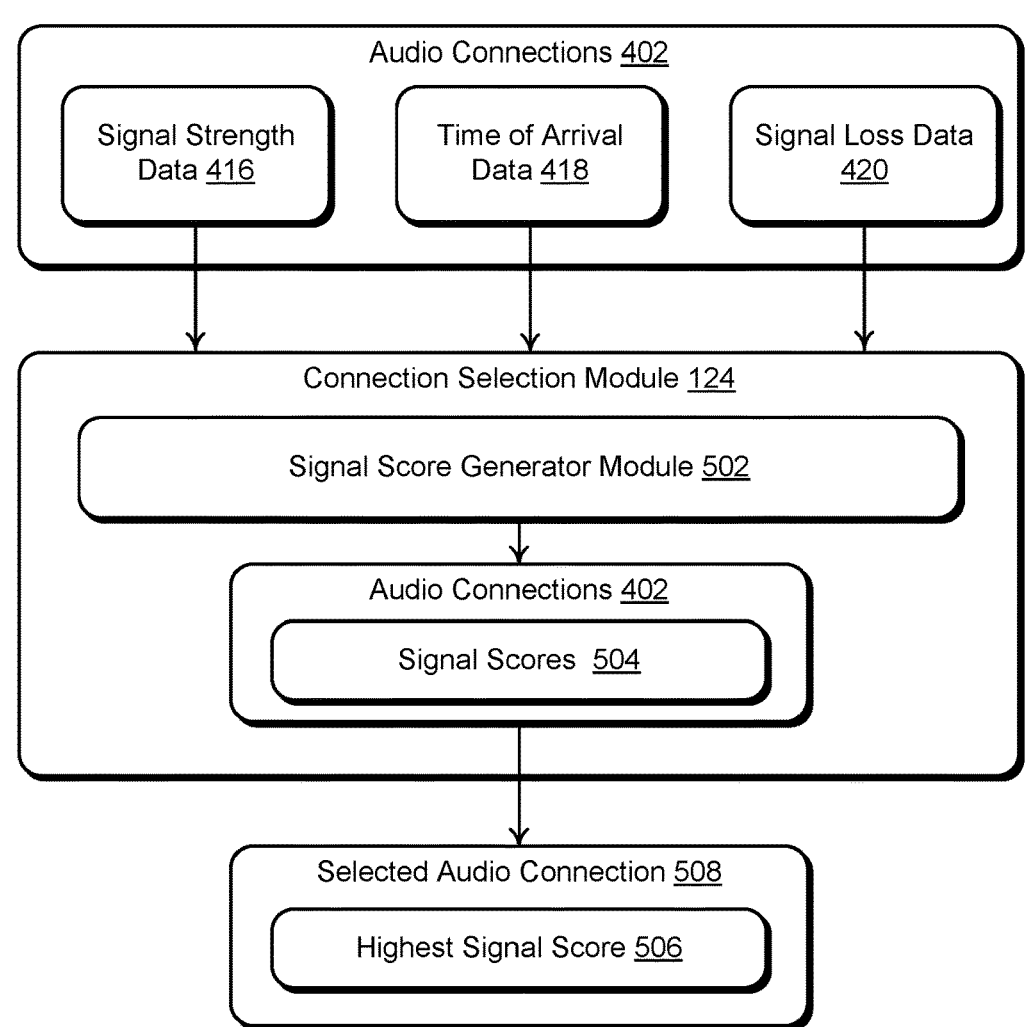
FIG. 5 depicts an example system in which aspects of audio connection selections based on audio drop predictions can be implemented to select an audio connection from the multiple audio connections.

FIG. 5 depicts an example system 500 in which aspects of audio connection selections based on audio drop predictions can be implemented to select an audio connection from the multiple audio connections. As shown, the example system 500 includes a connection selection module 124, which can be any one or a combination of the connection selection modules 124a, 124b, 124c of the devices 102, 104, 106. As shown, the connection selection module 124 receives the signal strength data 416, the time of arrival data 418, and the signal loss data 420 associated with each one of the multiple audio connections 402.

Based on the signal strength data 416, the connection selection module 124 determines path loss measurements for each of the audio connections 402 using similar techniques as those discussed above with reference to FIG. 3. For example, the connection selection module 124 determines a path loss measurement for a broadcast signal 414 by calculating a difference between the transmitter power output of the broadcast signal 414 and the received signal strength of the broadcast signal 414. If the transmitter power output of the broadcast signals 414 is not encodable for the specific type of broadcast signal 414, the path loss measurements are determined based on a fixed power output for the specific type of radio device transmitting the broadcast signals 414. Further, the connection selection module 124 determines an average path loss measurement for a respective audio connection 402 based on individual path loss measurements for each of the broadcast signals 414 transmitted via the respective audio connection 402.

For each of the audio connections 402, the connection selection module 124 further determines whether the broadcast signals 414 are received via a direct signal path and/or reflected signal paths based on the time of arrival data 418 using similar techniques as those discussed above with reference to FIG. 3. In examples in which the broadcast signals 414 are UWB ranging signals, for instance, one-way UWB ranging techniques and/or two-way UWB ranging techniques can be utilized by one or more of the devices 102, 104, 106 to determine distances traveled by the ranging signals, in accordance with IEEE standard 802.15.4z. In examples in which the broadcast signals 414 are Bluetooth channel sounding signals, two or more of the devices 102, 104, 106 can exchange channel sounding signals to determine a distance traveled by the channel sounding signals using time-of-departures, time-of-arrivals, and time-of-flights of the channel sounding signals.

Using the distance traveled, the connection selection module 124 can determine whether the broadcast signals 414 of a respective audio connection 402 travel via a direct signal path and/or via reflected signal paths. As previously discussed above with reference to FIG. 3, for instance, the connection selection module 124 determines that a broadcast signal 414 arrives via a direct signal path of a respective audio connection 402 if the distance traveled by the broadcast signal 414 corresponds to a shortest path of the respective audio connection 402. In contrast, the connection selection module 124 determines that a broadcast signal 414 arrives via a reflected signal path if the distance traveled by the broadcast signal 414 is greater than the shortest path of the respective audio connection 402.

In accordance with the described techniques, the connection selection module 124 employs a signal score generator module 502 which generates signal scores 504 for each of the audio connections 402 based on the path loss measurements, the number or percentage of the broadcast signals that travel via the direct signal path, and the number of lost broadcast signals. For example, a respective audio connection 402 having a relatively lower average path loss is assigned an increased signal score 504 in comparison to other audio connections 402 having relatively higher average path losses. Further, a respective audio connection 402 having a relatively higher number of the broadcast signals 414 arriving via a direct signal path is assigned an increased signal score 504 in comparison to other audio connections 402 having a relatively lower number of the broadcast signals 414 arriving via the direct signal path. Moreover, a respective audio connection 402 having a relatively lower number of lost broadcast signals 414 is assigned an increased signal score 504 in comparison to other audio connections 402 having relatively higher numbers of lost broadcast signals 414.

In one or more implementations, the connection selection module 124 selects an audio connection from the audio connections 402 having a highest signal score 506. Due to the audio connection 408 experiencing a reduced degree of cross body path loss along the direct signal path in comparison to the other audio connections, the audio connection 408 may have a decreased average path loss, fewer broadcast signals that are lost via the direct signal path, and in turn, fewer broadcast signals that are lost altogether. Given this, the audio connection 408 may be assigned the highest signal score 506. Further, the connection selection module 124 initiates a transfer of the audio stream 116 to cause the audio stream 116 to be provided via the selected audio connection 508. To do so, the connection selection module 124 disconnects a first audio stream in which the audio data packets are provided via a previous audio connection, and connects a second audio stream in which the audio data packets are provided via the selected audio connection 508.

In one or more implementations, the transfer of the audio stream 116 causes the audio data packets to be transmitted by a different audio source device. For example, the transfer of the audio stream 116 causes the audio data packets to be transmitted by the second audio source device 104, rather than the first audio source device 102. Additionally or alternatively, the transfer of the audio stream 116 causes the audio data packets to be received by a different audio output component of the audio output device 106. For example, the transfer of the audio stream 116 causes the audio data packets to be received by the second audio output component 120, rather than the first audio output component 118.

Figure 6:
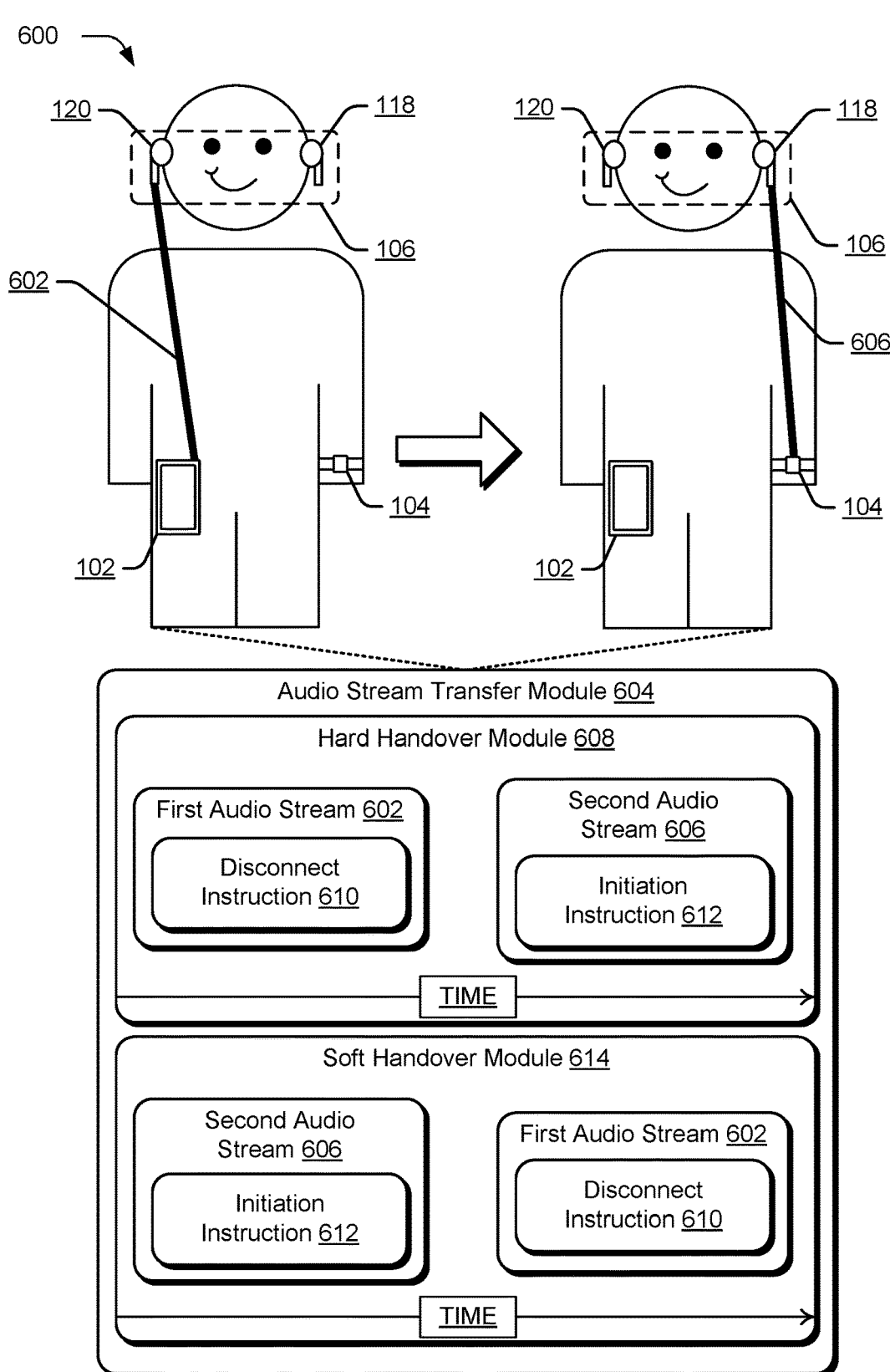
FIG. 6 depicts an example showing how an audio stream is transferred to be provided via a different audio connection in accordance with one or more implementations.

FIG. 6 depicts an example 600 showing how an audio stream is transferred to be provided via a different audio connection in accordance with one or more implementations. In the example 600, a first audio stream 602 provides audio data packets of an audio file via an audio connection between the first audio source device 102 and the second audio output component 120. Based on an audio drop prediction 322 of the first audio stream 602, the connection selection module 124 selects the audio connection between the second audio source device 104 and the first audio output component 118, and initiates a transfer of the audio stream to provide the audio data packets of the audio file via the selected audio connection. To do so, an audio stream transfer module 604 is employed to disconnect the first audio stream 602 and connect a second audio stream 606 which provides the audio data packets to the audio output device 106 via the selected audio connection. Notably, an instance of the audio stream transfer module 604 is included in each of the devices 102, 104, 106, and as such, the described functionality of the audio stream transfer module 604 is implemented at least partially in hardware of one or more of the first audio source device 102, the second audio source device 104, and the audio output device 106.

In one or more implementations, the audio stream transfer module 604 employs a hard handover module 608 to disconnect the first audio stream 602 before initiating the second audio stream 606. By way of example, the hard handover module 608 first issues a disconnect instruction 610 to the first audio source device 102 and/or the audio output device 106 to disconnect the first audio stream 602. After the first audio stream 602 is disconnected, the hard handover module 608 issues an initiation instruction 612 to the second audio source device 104 to initiate the second audio stream 606. Then, the hard handover module 608 connects the second audio stream 606, thereby causing the audio data packets of the audio file to be played back at the audio output device 106 via the second audio stream 606, rather than the first audio stream 602.

Additionally or alternatively, the audio stream transfer module 604 employs a soft handover module 614 to initiate the second audio stream 606 before disconnecting the first audio stream 602. By way of example, the soft handover module first issues the initiation instruction 612 to the second audio source device 104 to initiate the second audio stream 606. Notably, the initiation instruction 612 issued by the soft handover module 614 causes the second audio stream 606 to be initiated in the background of the second audio source device 104 (e.g., without being provided to the audio output device 106 for output). In this way, the second audio source device 104 can synchronize the second audio stream 606 with the first audio stream 602 before the second audio stream 606 is output by the audio output device 106. To do so, the first audio source device 102 broadcasts the first audio stream 602 to the audio output device 106 and to the second audio source device 104. Based on the received first audio stream 602, the second audio source device 104 synchronizes the second audio stream 606 with the first audio stream 602 (e.g., so that corresponding portions of the audio file of both audio streams 602, 606 are concurrently played back). Once the audio streams 602, 606 are synchronized, the soft handover module 614 issues the disconnect instruction 610 to the first audio source device 102 and/or the audio output device 106 to disconnect the first audio stream 602. Further, the soft handover module 614 connects the second audio stream 606, thereby causing the audio file to be played back at the audio output device 106 via the second audio stream 606, rather than the first audio stream 602.

Notably, utilizing a soft handover to transfer the audio stream often leads to fewer audio drops than utilizing a hard handover to transfer the audio stream. Indeed, by disconnecting the first audio stream 602 prior to initiating the second audio stream 606, the user 108 may experience audio drops during the transition between the first and second audio streams 602, 606 (but significantly fewer audio drops than would otherwise occur due to the path loss limitations in the non-multipath environment). In contrast, by initiating and synchronizing the second audio stream 606 prior to disconnecting the first audio stream 602, audio drops are typically avoided.

However, not all devices are equipped with broadcast capability to enable transferring the audio stream utilizing a soft handover. Indeed, the first audio source device 102 broadcasts the first audio stream 602 to both the audio output device 106 and the second audio source device 104, so that the second audio source device 104 can synchronize the second audio stream 606 with the first audio stream 602. However, many Bluetooth-enabled devices are configured in accordance with the Bluetooth Hands-Free Profile (HFP) or the Bluetooth Advanced Audio Distribution Profile (A2DP) which are point to point audio connections, without broadcast capabilities. In contrast, Bluetooth-enabled devices that are configured with Bluetooth Low Energy (BLE) functionality can broadcast audio to multiple different devices. Given this, in implementations in which the devices 102, 104, 106 are configured with BLE functionality, the devices 102, 104, 106 utilize the soft handover module 614 to transfer the audio stream, thereby further reducing audio drops. Further, in implementations in which the devices 102, 104, 106 are not configured with BLE functionality and instead are configured in accordance with the Bluetooth HFP and/or Bluetooth A2DP profiles, the devices 102, 104, 106 utilize the hard handover module 608 to transfer the audio stream.

Figure 7:
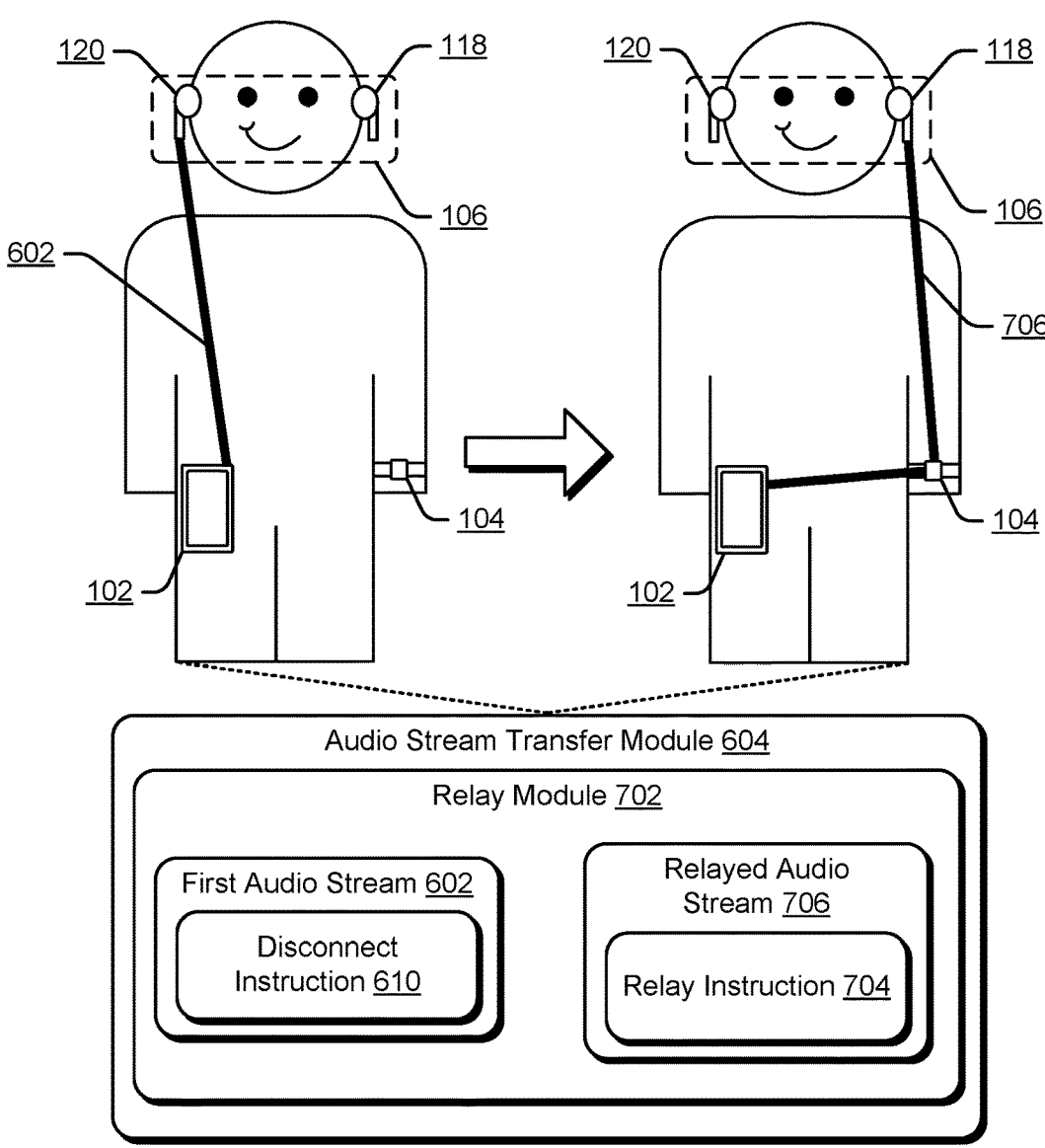
FIG. 7 depicts an example showing how an audio stream is transferred to be provided via a different audio connection in accordance with one or more implementations.

FIG. 7 depicts an example 700 showing how an audio stream is transferred to be provided via a different audio connection in accordance with one or more implementations. Based on an audio drop prediction 322 of the first audio stream 602, the connection selection module 124 selects the audio connection between the second audio source device 104 and the first audio output component 118, and initiates a transfer of the audio stream to provide the audio data packets of the audio file via the selected audio connection. To do so in this example 700, the audio stream transfer module 604 employs a relay module 702 to issue the disconnect instruction 610 to the first audio source device 102 and/or the audio output device 106 to disconnect the first audio stream 602. Further, the relay module 702 issues a relay instruction 704 to connect a relayed audio stream 706. By way of example, the relay instruction 704 causes the first audio source device 102 to transmit the audio data packets of the audio file to the second audio source device 104, which relays the audio data packets to the first audio output component 118 for output by the audio output device 106.

FIG. 8 depicts an example procedure 800 for audio connection selections based on audio drop predictions to initiate an audio stream transfer based on an audio drop prediction as implemented by an audio output device. Audio data packets of an audio stream are received from a first audio source device (block 802). By way of example, the audio output device 106 receives audio data packets of an audio file as part of an audio stream 116 from the first audio source device 102, and outputs the audio stream 116. Notably, the audio data packets are received via a first audio connection between the first audio source device 102 and a first audio output component 118 of the audio output device 106

An audio drop of the audio stream is predicted (block 804). By way of example, the audio drop prediction module 122c of the audio output device 106 generates an audio drop prediction 322 for the audio stream 116. As part of predicting the audio drop, signal strength data is received indicating an increase in path loss of signals exchanged between the audio output device and the first audio source device (block 806). For example, the first audio source device 102 transmits the audio path signals 302 with an indication of transmitter power output, and the audio output device 106 measures a received signal strength of the audio path signals 302. Further, the signal strength data 304 is provided to the audio drop prediction module 122c of the audio output device 106. The audio drop prediction module 122c employs a path loss detector module 306 to determine path loss measurements for the audio path signals 302, and detect a path loss increase 308 in the path loss measurements. In some examples, the path loss increase 308 is detected as a threshold number of consecutively transmitted audio path signals 302 that have a path loss measurement that exceeds a baseline path loss by at least a threshold amount and/or that is within a particular range of path loss values.

As part of predicting the audio drop, time of arrival data is received indicating a decrease in a number of the signals that travel via reflected signal paths (block 808). For example, the radio devices 110a, 110b, 110c of one or more of the devices 102, 104, 106 determine time of arrival data 312 associated with the audio path signals 302. Further, the time of arrival data 312 is provided to the audio drop prediction module 122c, which employs a reflection detector module 310 to detect a reflection decrease 314 based on the time of arrival data 312. To do so, the reflection detector module 310 determines a distance traveled by the audio path signals 302 using the time of arrival data 312. Based on the distance traveled, the reflection detector module 310 determines whether a respective audio path signal 302 was received via a direct signal path and/or via one or more reflected signal paths. In one or more implementations, the reflection decrease 314 is detected as a threshold percentage of consecutively transmitted audio path signals 302 that do not arrive at the audio output device 106 via the reflected signal paths, and instead only arrive via the direct signal path or do not arrive at all.

As part of predicting the audio drop, signal loss data is received indicating that a threshold number of the signals are lost (block 810). For example, the audio output device 106 determines signal loss data 318 by monitoring a number of the audio path signals 302 that are lost. The signal loss data 318 is provided to the audio drop prediction module 122c, which employs a signal loss detector module 316 to determine that the number of lost audio path signals 302 exceeds a signal loss threshold 320 based on the signal loss data 318. In one example, the signal loss threshold 320 is a threshold percentage of consecutively transmitted audio path signals 302 being lost.

A transfer of the audio stream is initiated to receive the audio stream from a second audio source device based on the audio drop being predicted (block 812). Based on the audio drop prediction 322 of the audio stream 116 provided via the first audio connection, the audio drop prediction module 122c instructs the connection selection module 124c of the audio output device 106 to select a second audio connection along which a new audio stream is to be provided. For example, the second audio connection is between the second audio source device 104 and the first audio output component 118. Further, an audio stream transfer module 604 of the audio output device 106 is employed to disconnect the audio stream 116 provided via the first audio connection, and connect the new audio stream provided via the second audio connection.

FIG. 9 depicts an example procedure 900 for audio connection selections based on audio drop predictions to select an audio connection. Signal strength data is received for each of multiple audio connections between multiple audio source devices and multiple audio output components of an audio output device, the signal strength data indicating path loss measurements for each of the multiple audio connections based on signals exchanged between the multiple audio source devices and the multiple audio output components (block 902). By way of example, the connection selection module 124a of the first audio source device 102 receives an audio drop prediction 322 for a first audio stream provided via a first audio connection between the first audio source device 102 and the first audio output component 118.

In response, the connection selection module 124a initiates the devices 102, 104, 106 to exchange broadcast signals 414 via multiple audio connections 402. By way of example, the audio source devices 102, 104 transmit broadcast signals 414 via each of the audio connections 404, 406, 408, 410 to each of the audio output components 118, 120. Further, the first audio source device 102 transmits broadcast signals 414 via the audio connection 412 to the second audio source device 104. The audio source devices 102, 104 encode the broadcast signals 414 with a transmitter power output, and the devices receiving the broadcast signals 414 (e.g., the second audio source device 104 and the audio output device 106) measure received signal strength of the broadcast signals 414. The signal strength data 416 is provided to the connection selection module 124a of the first audio source device 102, which determines path loss measurements for the broadcast signals 414 transmitted via each of the multiple audio connections 402 based on the signal strength data 416.

Time of arrival data is received for each of the multiple audio connections, the time of arrival data indicating whether the signals are traveling via a direct signal path that does not include reflections (block 904). By way of example, the radio devices 110a, 110b, 110c of any one or a combination of the devices 102, 104, 106 can measure time of arrival data 418 of the broadcast signals 414. The time of arrival data 418, for instance, includes time-of-arrivals, time-difference-of-arrivals, and time-of-flights associated with the broadcast signals 414. The time of arrival data 418 is provided to the connection selection module 124a, which determines distances traveled by the broadcast signals 414 transmitted via each of the audio connections 402 based on the time of arrival data 418. Using the distance traveled, connection selection module 124a determines whether the broadcast signals 414 of a respective audio connection 402 travel via a direct signal path and/or reflected signal paths of the respective audio connection 402.

Signal loss data is received for each of the multiple audio connections, the signal loss data indicating a number of lost signals (block 906). For example, the second audio source device 104 and the audio output device 106 that receive the broadcast signals 414 collect signal loss data indicating a number of broadcast signals 414 that are lost via each of the audio connections 402. The signal loss data 420 is provided to the connection selection module 124a.

An audio connection of the multiple audio connections is selected based on the path loss measurements, the time of arrival data, and the signal loss data (block 908). By way of example, the connection selection module 124a employs a signal score generator module 502 which generates signal scores 504 for each of the audio connections 402 based on the path loss measurements, the number or percentage of the broadcast signals 414 that travel via the direct signal path, and the number of lost broadcast signals 414. In one or more implementations, a higher signal score is assigned to audio connections 402 having reduced path loss measurements, a greater number of the broadcast signals 414 traveling along the direct signal path, and a reduced number of the lost broadcast signals 414, as compared to other audio connections 402. Further, the connection selection module 124a selects an audio connection having a highest signal score 506 from among the multiple audio connections 402.

Audio data packets of an audio stream are transmitted to the audio output device via the audio connection (block 910). By way of example, the connection selection module 124a initiates the first audio source device 102 to transmit audio data packets of an audio file as part of an audio stream to the audio output device 106 via the selected audio connection. In one or more implementations, to transmit the audio stream to the audio output device 106, the connection selection module 124a initiates a transfer of the audio stream. For example, the connection selection module 124a disconnects a previous audio stream in which the audio data packets of the audio file are provided to the audio output device 106 via a previous audio connection. Further, the connection selection module 124a connects a new audio stream in which the audio data packets of the audio file are provided to the audio output device 106 via the selected audio connection.

In one or more implementations, the transfer of the audio stream is performed as a hard handover in which the previous audio stream is disconnected before the new audio stream is initiated. Additionally or alternatively, the transfer of the audio stream is performed as a soft handover in which the new audio stream is initiated in the background of a respective audio source device and synchronized with the previous audio stream before the previous audio stream is disconnected. Additionally or alternatively, the transfer of the audio stream is performed as a relay in which the new audio stream is a relayed audio stream 706 in which the first audio source device 102 transmits the audio data packets of the audio stream to the second audio source device 104, and the second audio source device 104 relays the audio data packets of the audio stream to the audio output device 106.

Figure 10:
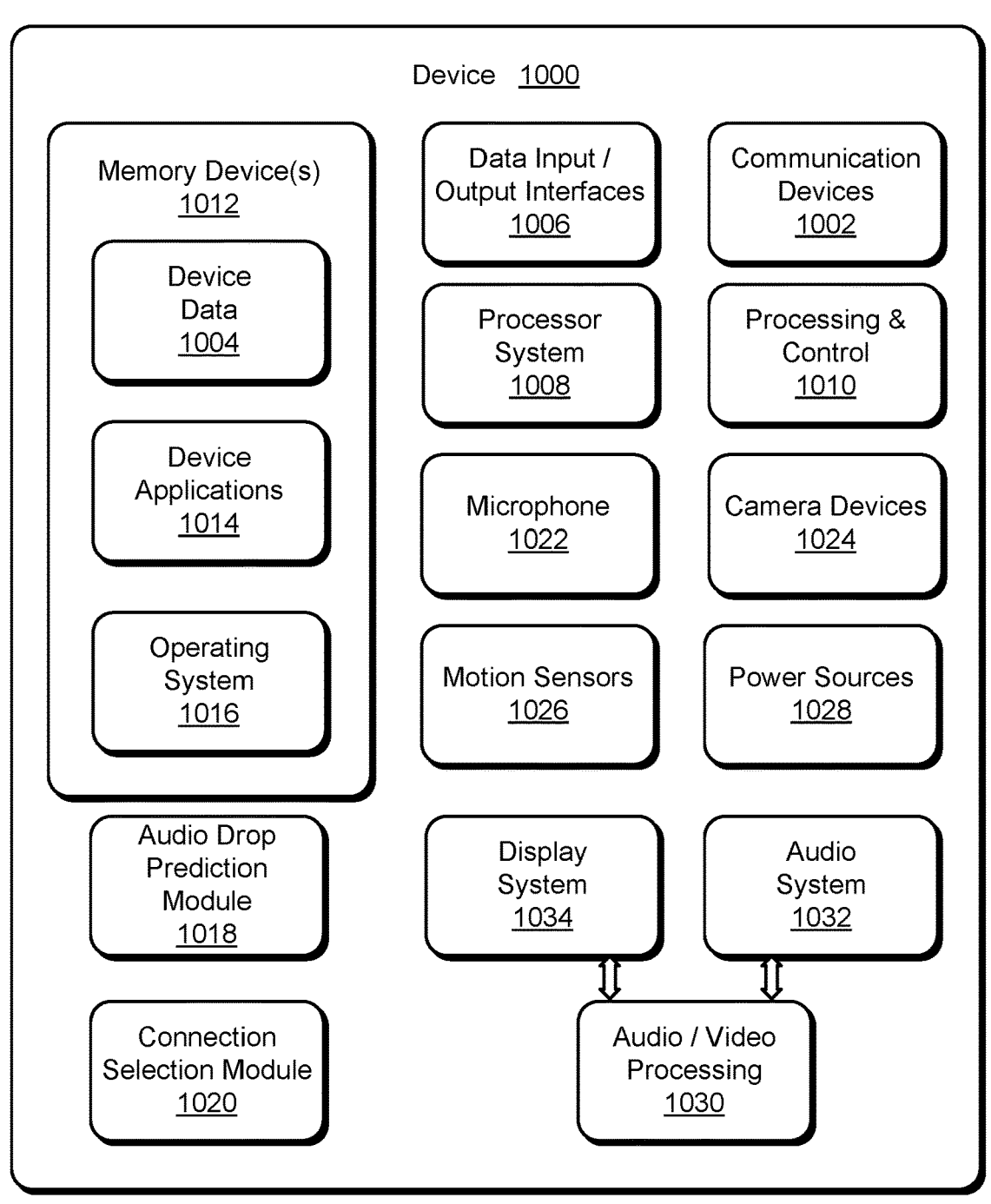
FIG. 10 illustrates various components of an example device that can implement aspects of audio connection selections based on audio drop predictions.

FIG. 10 illustrates various components of an example device 1000, which can implement aspects of the techniques and features for audio connection selections based on audio drop predictions, as described herein. The example device 1000 can be implemented as any of the devices described with reference to the previous FIGS. 1-9, such as any type of a wireless device, mobile device, mobile phone, flip phone, client device, companion device, paired device, display device, tablet, computing, communication, entertainment, gaming, media playback, and/or any other type of computing and/or electronic device. For example, the first audio source device 102, the second audio source device 104, and the audio output device 106 described with reference to FIGS. 1-9 may be implemented as the example device 1000.

The example device 1000 can include various, different communication devices 1002 that enable wired and/or wireless communication of device data 1004 with other devices. The device data 1004 can include any of the various devices' data and content that is generated, processed, determined, received, stored, and/or communicated from one computing device to another. Generally, the device data 1004 can include any form of audio, video, image, graphics, and/or electronic data that is generated by applications executing on a device. The communication devices 1002 can also include transceivers for cellular phone communication and/or for any type of network data communication.

The example device 1000 can also include various, different types of data input/output (I/O) interfaces 1006, such as data network interfaces that provide connection and/or communication links between the devices, data networks, and other devices. The I/O interfaces 1006 can be used to couple the device to any type of components, peripherals, and/or accessory devices, such as a computer input device that may be integrated with the example device 1000. The I/O interfaces 1006 may also include data input ports via which any type of data, information, media content, communications, messages, and/or inputs can be received, such as user inputs to the device, as well as any type of audio, video, image, graphics, and/or electronic data received from any content and/or data source.

The example device 1000 includes a processor system 1008 of one or more processors (e.g., any of microprocessors, controllers, and the like) and/or a processor and memory system implemented as a system-on-chip (SoC) that processes computer-executable instructions. The processor system 1008 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1010. The example device 1000 may also include any type of a system bus or other data and command transfer system that couples the various components within the device. A system bus can include any one or combination of different bus structures and architectures, as well as control and data lines.

The example device 1000 also includes memory and/or memory devices 1012 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1012 include volatile memory and non-volatile memory, fixed and removable media devices, and any suitable memory device or electronic data storage that maintains data for computing device access. The memory devices 1012 can include various implementations of random-access memory (RAM), read-only memory (ROM), flash memory, and other types of storage media in various memory device configurations. The example device 1000 may also include a mass storage media device.

The memory devices 1012 (e.g., as computer-readable storage memory) provide data storage mechanisms, such as to store the device data 1004, other types of information and/or electronic data, and various device applications 1014 (e.g., software applications and/or modules). For example, an operating system 1016 can be maintained as software instructions with a memory device 1012 and executed by the processor system 1008 as a software application. The device applications 1014 may also include a device manager, such as any form of a control application, software application, signal-processing and control module, code that is specific to a particular device, a hardware abstraction layer for a particular device, and so on.

In this example, the device 1000 includes an audio drop prediction module 1018 and a connection selection module 1020 that implement various aspects of the described features and techniques for audio connection selections based on audio drop predictions. The audio drop prediction module 1018 and/or the connection selection module 1020 can be implemented with hardware components and/or in software as one of the device applications 1014, such as when the example device 1000 is implemented as the first audio source device 102, the second audio source device 104, and/or the audio output device 106 as described with reference to FIGS. 1-9. Examples of the audio drop prediction module 1018 include the audio drop prediction modules 122a, 122b, 122c that are implemented by the devices 102, 104, 106, respectively. Further, examples of the connection selection module 1020 include the connection selection modules 124a, 124b, 124c that are implemented by the devices 102, 104, 106, respectively. Therefore, the audio drop prediction module 1018 and the connection selection module 1020 can be implemented as software application(s) and/or as hardware components in any one or a combination of the devices 102, 104, 106. In implementations, the audio drop connection module 1018 and the connection selection module 1020 may include independent processing, memory, and logic components as a computing and/or electronic device integrated with the example device 1000.

The example device 1000 can also include a microphone 1022 and/or camera devices 1024, as well as motion sensors 1026, such as may be implemented as components of an inertial measurement unit (IMU). The motion sensors 1026 can be implemented with various sensors, such as a gyroscope, an accelerometer, and/or other types of motion sensors to sense motion of the device 1000. The motion sensors 1026 can generate sensor data vectors having three-dimensional parameters (e.g., rotational vectors in x, y, and z-axis coordinates) indicating location, position, acceleration, rotational speed, and/or orientation of the device. The example device 1000 can also include one or more power sources 1028, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1000 can also include an audio and/or video processing system 1030 that generates audio data for an audio system 1032 and/or generates display data for a display system 1034. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1000. Alternatively, the audio system and/or the display system are external, peripheral components to the example device.

As used herein, including in the claims, "or" as used in a list of items (e.g., a list of items prefaced by a phrase such as "at least one of" or "one or more of" or "based at least in part on") indicates an inclusive list such that, a list of at least one of A, B, or C means A or B or C or AB or AC or BC or ABC (i.e., A and B and C). Further, as used herein, the phrase "based on" shall not be construed as a reference to a closed set of conditions. For example, an operation or determination described as "based on condition A" may be based on both a condition A and a condition B without departing from the scope of the present disclosure, and the phrase "based on" shall be construed in the same manner as the phrase "based at least in part on."

Although implementations for audio connection selections based on audio drop predictions have been described in language specific to features and/or methods, the appended claims are not necessarily limited to the specific features or methods described. Rather, the specific features and methods are disclosed as example implementations for audio connection selections based on audio drop predictions, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to an audio output device comprising an audio drop prediction module, implemented at least partially in hardware of the audio output device, to receive audio data packets of an audio stream from a first audio source device, predict an audio drop of the audio stream based on an increase in path loss of signals exchanged between the audio output device and the audio source device, a decrease in a number of the signals that travel via reflected signal paths, and a threshold number of the signals being lost, and initiate, based on the audio drop being predicted, a transfer of the audio stream to receive the audio stream from a second audio source device.

In some aspects, the techniques described herein relate to an audio output device, wherein the audio drop prediction module is configured to determine whether the signals travel via a direct signal path or the reflected signal paths based on time of arrival data of the signals.

In some aspects, the techniques described herein relate to an audio output device, wherein the transfer of the audio stream causes a disconnection of a first audio stream between the first audio source device and the audio output device, and a connection of a second audio stream between the second audio source device and the audio output device.

In some aspects, the techniques described herein relate to an audio output device, wherein the disconnection of the first audio stream occurs before the second audio stream is initiated by the second audio source device.

In some aspects, the techniques described herein relate to an audio output device, wherein the second audio stream is initiated by the second audio source device before the disconnection of the first audio stream, the second audio stream being synchronized with the first audio stream before being output by the audio output device.

In some aspects, the techniques described herein relate to an audio output device, wherein the transfer of the audio stream causes the audio stream to be transmitted from the first audio source device to the second audio source device, and relayed by the second audio source device to the audio output device.

In some aspects, the techniques described herein relate to an audio output device, wherein to receive the audio stream from the first audio source device, the audio drop prediction module is configured to receive, by a first audio output component, the audio data packets of the audio stream from the first audio source device and provide the audio data packets to a second audio output component.

In some aspects, the techniques described herein relate to an audio output device, wherein to initiate the transfer of the audio stream, the audio drop prediction module is configured to receive, by the second audio output component, the audio data packets of the audio stream from the second audio source device and provide the audio data packets to the first audio output component.

In some aspects, the techniques described herein relate to an audio output device, wherein to initiate the transfer of the audio stream, the audio drop prediction module is configured to select an audio connection between the second audio source device and the audio output device from among one or more other audio connections between one or more other audio source devices and the audio output device.

In some aspects, the techniques described herein relate to an audio output device, wherein the audio connection is selected based on path loss measurements and time of arrival data associated with the audio connection and each of the one or more other audio connections.

In some aspects, the techniques described herein relate to a method comprising receiving, by an audio source device, signal strength data for each of multiple audio connections between multiple audio source devices and multiple audio output components of an audio output device, the signal strength data indicating path loss measurements for each of the multiple audio connections based on signals exchanged between the multiple audio source devices and the multiple audio output components, receiving, by the audio source device, time of arrival data for each of the multiple audio connections, the time of arrival data indicating whether the signals are traveling via a direct signal path that does not include reflections, receiving, by the audio source device, signal loss data for each of the multiple audio connections, the signal loss data indicating a number of lost signals, selecting, by the audio source device, an audio connection of the multiple audio connections based on the path loss measurements, the time of arrival data, and the signal loss data, transmitting, by the audio source device, audio data packets of an audio stream to the audio output device via the audio connection.

In some aspects, the techniques described herein relate to a method, wherein the selecting the audio connection includes generating a signal score for each of the multiple audio connections and selecting the audio connection having a highest signal score from among the multiple audio connections.

In some aspects, the techniques described herein relate to a method, wherein the signal score for a respective audio connection is increased based on the respective audio connection having decreased path loss measurements in comparison to other audio connections, the respective audio connection having an increased number of the signals that are traveling via the direct signal path in comparison to the other audio connections, and the respective audio connection having a decreased number of the lost signals in comparison to the other audio connections.

In some aspects, the techniques described herein relate to a method, wherein the selecting the audio connection includes selecting the audio source device from among the multiple audio source devices to provide the audio stream for output by the audio output device.

In some aspects, the techniques described herein relate to a method, wherein the selecting the audio connection includes selecting, from among the multiple audio output components, a first audio output component of the audio output device to receive the audio stream and provide the audio stream to a second audio output component of the audio output device.

In some aspects, the techniques described herein relate to a method, wherein the selecting and the transmitting is in response to predicting that an audio drop will occur in a previous audio stream output by the audio output device that is provided via a previous audio connection, the audio drop predicted based on path loss associated with additional signals exchanged via the previous audio connection, reflections of the additional signals of the previous audio stream, and a number of lost additional signals of the previous audio stream.

In some aspects, the techniques described herein relate to a method, wherein the transmitting the audio stream includes causing the audio output device to switch from outputting the previous audio stream that is received via the previous audio connection to outputting the audio stream that is received via the audio connection.

In some aspects, the techniques described herein relate to a method, wherein the previous audio stream is disconnected via the previous audio connection before the audio stream is initiated by the audio source device, or the audio stream is initiated by the audio source device before the previous audio stream is disconnected via the previous audio connection.

In some aspects, the techniques described herein relate to a method, wherein the transmitting the audio stream includes receiving, by the audio source device, the audio stream from a different audio source device, and relaying, by the audio source device, the audio stream to the audio output device via the audio connection.

In some aspects, the techniques described herein relate to an audio source device comprising an audio drop prediction module, implemented at least partially in hardware of the audio source device, to transmit audio data packets of an audio stream to a first audio output component of an audio output device, the audio data packets being provided to a second audio output component of the audio output device by the first audio output component, predict an audio drop of the audio stream based on an increase in path loss of signals exchanged between the audio source device and the first audio output component, a decrease in a number of the signals that travel via reflected signal paths, and a threshold number of the signals being lost, and initiate, based on the audio drop being predicted, a transfer of the audio stream to transmit the audio stream to the second audio output component of the audio output device.

The invention claimed is:

1. An audio output device comprising:

at least one memory; and at least one processor coupled with the at least one memory and configured to cause the audio output device to:

connect a first audio connection between the audio output device and a first audio source device to receive an audio stream from the first audio source device;

predict an audio drop of the audio stream; and responsive to the audio drop being predicted:

disconnect the first audio connection; and connect a second audio connection between the audio output device and a second audio source device to receive the audio stream from the second audio source device, the second audio connection selected based on:

the second audio connection being associated with decreased path loss measurements in comparison to other audio connections;

the second audio connection having an increased number of broadcast signals that are traveling via a direct signal path in comparison to the other audio connections; and/or the second audio connection having a decreased number of lost broadcast signals in comparison to the other audio connections.

2. The audio output device of claim 1, wherein the at least one processor is configured to cause the audio output device to determine whether the broadcast signals travel via the direct signal path or reflected signal paths based on time of arrival data of the broadcast signals.

3. The audio output device of claim 1, wherein the disconnection of the first audio connection occurs before the connection of the second audio connection.

4. The audio output device of claim 1, wherein the second audio connection is connected before the first audio connection is disconnected.

5. The audio output device of claim 1, wherein the second audio connection causes the audio stream to be transmitted from the first audio source device to the second audio source device, and relayed by the second audio source device to the audio output device.

6. The audio output device of claim 1, wherein to receive the audio stream from the first audio source device, the at least one processor is configured to cause the audio output device to receive, by a first audio output component, the audio stream from the first audio source device and provide the audio stream to a second audio output component.

7. The audio output device of claim 1, wherein to connect the second audio connection, the at least one processor is configured to cause the audio output device to select the second audio connection from among multiple audio connections between multiple audio source devices and the audio output device.

8. A method comprising:

receiving, by an audio source device, information describing broadcast signals exchanged along each of multiple audio connections between multiple audio source devices and multiple audio output components of an audio output device;

selecting, by the audio source device, an audio connection of the multiple audio connections based on the information indicating:

the audio connection being associated with decreased path loss measurements in comparison to other audio connections;

the audio connection having an increased number of the broadcast signals that are traveling via a direct signal path in comparison to the other audio connections; and/or the audio connection having a decreased number of lost broadcast signals in comparison to the other audio connections; and transmitting, by the audio source device, audio data packets of an audio stream to the audio output device via the audio connection.

9. The method of claim 8, wherein selecting the audio connection includes generating a signal score for each of the multiple audio connections and selecting the audio connection having a highest signal score from among the multiple audio connections.

10. The method of claim 8, wherein selecting the audio connection includes selecting the audio source device from among the multiple audio source devices to transmit the audio stream for output by the audio output device.

11. The method of claim 8, wherein selecting the audio connection and transmitting the audio data packets of the audio stream are performed in response to predicting that an audio drop will occur in a previous audio stream output by the audio output device that is provided via a previous audio connection, the audio drop predicted based on path loss associated with audio signals exchanged via the previous audio connection, reflections of the audio signals of the previous audio stream, and a number of lost audio signals of the previous audio stream.

12. The method of claim 11, wherein transmitting the audio stream includes causing the audio output device to switch from outputting the previous audio stream that is received via the previous audio connection to outputting the audio stream that is received via the audio connection.

13. An audio source device comprising:

at least one memory; and at least one processor coupled with the at least one memory and configured to cause the audio source device to:

connect a first audio connection between the audio source device and a first audio output component of an audio output device to transmit an audio stream to the first audio output component;

predict an audio drop of the audio stream; and responsive to the audio drop being predicted:

disconnect the first audio connection; and connect a second audio connection between the audio source device and a second audio output component of the audio output device to transmit the audio stream to the second audio output component, the second audio connection selected based on:

the second audio connection being associated with decreased path loss measurements in comparison to other audio connections;

the second audio connection having an increased number of broadcast signals that are traveling via a direct signal path in comparison to the other audio connections; and/or the second audio connection having a decreased number of lost broadcast signals in comparison to the other audio connections.

14. The audio output device of claim 1, wherein the at least one processor is configured to cause the audio output device to predict the audio drop of the audio stream responsive to detecting an increase in path loss of audio signals exchanged between the audio output device and the first audio source device during the audio stream.

15. The audio output device of claim 1, wherein the at least one processor is configured to cause the audio output device to predict the audio drop of the audio stream responsive to detecting a decrease in a number of audio signals exchanged between the audio output device and the first audio source device that travel via reflected signal paths during the audio stream.

16. The audio output device of claim 1, wherein the at least one processor is configured to cause the audio output device to predict the audio drop of the audio stream responsive to detecting a threshold number of audio signals exchanged between the audio output device and the first audio source device that are lost during the audio stream.

17. The method of claim 8, wherein the information includes signal strength data indicating path loss measurements for the broadcast signals, time of arrival data strength data indicating whether the broadcast signals are traveling via the direct signal path, and signal loss data indicating lost broadcast signals.

18. The method of claim 9, wherein the signal score of the audio connection increases when:

the audio connection is associated with the decreased path loss measurements in comparison to the other audio connections;

the audio connection has the increased number of the broadcast signals that are traveling via the direct signal path in comparison to the other audio connections; and the audio connection has the decreased number of lost broadcast signals in comparison to the other audio connections.

19. The audio source device of claim 13, wherein the at least one processor is configured to cause the audio source device to reduce a data transmission rate for the audio stream transmitted along the first audio connection responsive to the audio drop being predicted.

20. The audio source device of claim 13, wherein the at least one processor is configured to cause the audio source device to display a notification in response to the audio drop being predicted, the notification prompting a user to move the audio source device to a different location.

* * * * *